United States Patent
Reynolds et al.

(10) Patent No.: US 7,550,870 B2
(45) Date of Patent: Jun. 23, 2009

(54) METHOD AND APPARATUS FOR REMOTE POWER MANAGEMENT AND MONITORING

(75) Inventors: Charles H. Reynolds, Gilroy, CA (US); Ron L. Silorio, Pittsburg, CA (US)

(73) Assignee: Cyber Switching, Inc., San Jose, CA (US)

( * ) Notice: Subject to any disclaimer, the term of this patent is extended or adjusted under 35 U.S.C. 154(b) by 575 days.

(21) Appl. No.: 10/625,837

(22) Filed: Jul. 22, 2003

(65) Prior Publication Data

US 2004/0064198 A1   Apr. 1, 2004

Related U.S. Application Data

(63) Continuation-in-part of application No. 10/431,333, filed on May 6, 2003, now abandoned.

(60) Provisional application No. 60/378,342, filed on May 6, 2002.

(51) Int. Cl.
  H02J 3/14   (2006.01)
  G05B 11/01  (2006.01)
(52) U.S. Cl. ............. 307/32; 307/31; 700/286; 700/297
(58) Field of Classification Search ........... 700/22, 700/286, 297; 307/31, 32
  See application file for complete search history.

(56) References Cited

U.S. PATENT DOCUMENTS

| 4,090,088 A | 5/1978 | McMahon et al. ........... 307/38 |
|---|---|---|
| 4,322,842 A | 3/1982 | Martinez ..................... 370/11 |
| 4,349,879 A | 9/1982 | Peddie et al. ................ 364/492 |
| 4,517,562 A | 5/1985 | Martinez ............... 340/825.07 |
| 4,674,031 A | 6/1987 | Siska, Jr. .................... 364/184 |
| 4,719,364 A | 1/1988 | Pequet et al. ............... 307/141 |
| 4,769,555 A | 9/1988 | Pequet et al. ............... 307/141 |
| 4,899,129 A | 2/1990 | MacFadyen et al. ........ 340/310 |
| 4,918,562 A | 4/1990 | Pulizzi et al. ................. 361/86 |
| 5,384,490 A | 1/1995 | Swartz, Jr. .................... 307/38 |
| 5,424,903 A | 6/1995 | Schreiber .................... 361/166 |

(Continued)

FOREIGN PATENT DOCUMENTS

EP   0 660 486 A1   6/1995

(Continued)

OTHER PUBLICATIONS

Marway Products, Inc., Stand And Custom Power Products for Single and Three Phase Power, World Wide Web at http://www.seltronics.com/se03005.htm, 2 pages; Jan. 9, 1997; Copyright by Sel-Tronics, Inc.

(Continued)

*Primary Examiner*—Albert W Paladini
*Assistant Examiner*—Hal I Kaplan
(74) *Attorney, Agent, or Firm*—Quine Intellectual Property Law Group; Stephen J. LeBlanc

(57) ABSTRACT

Methods and/or systems for power monitoring and/or power cycling management provide a variety of different remote interfacing and provide individual current monitoring for each output in a power supply strip. In various implementations, the invention can be incorporated into a power supply strip for a network device rack thereby providing compact controllable and monitorable power for multiple network devices.

12 Claims, 17 Drawing Sheets

U.S. PATENT DOCUMENTS

| | | | |
|---|---|---|---|
| 5,436,510 A | 7/1995 | Gilbert | 307/38 |
| 5,450,334 A | 9/1995 | Pulizzi et al. | 364/492 |
| 5,506,790 A | 4/1996 | Nguyen | |
| 5,517,423 A | 5/1996 | Pomatto | 364/492 |
| 5,623,256 A | 4/1997 | Marcoux | 340/825.69 |
| 5,640,153 A | 6/1997 | Hildebrand et al. | 340/825.06 |
| 5,696,695 A | 12/1997 | Ehlers et al. | 364/492 |
| 5,721,934 A | 2/1998 | Scheurich | |
| 5,761,083 A | 6/1998 | Brown, Jr. et al. | 364/492 |
| 6,137,706 A | 10/2000 | Nesbitt et al. | 363/142 |
| 6,160,873 A * | 12/2000 | Truong et al. | 379/102.02 |
| 6,741,442 B1 | 5/2004 | McNally et al. | |
| 6,792,321 B2 * | 9/2004 | Sepe, Jr. | 700/65 |
| 6,868,295 B2 | 3/2005 | Huang | 700/90 |
| 6,879,806 B2 * | 4/2005 | Shorty | 455/11.1 |
| 7,043,543 B2 * | 5/2006 | Ewing et al. | 709/223 |
| 7,068,145 B2 * | 6/2006 | Reitmeier | 340/5.53 |
| 7,099,934 B1 | 8/2006 | Ewing et al. | |
| 7,141,891 B2 | 11/2006 | McNally et al. | |
| 7,171,461 B2 * | 1/2007 | Ewing et al. | 709/223 |
| 2001/0010032 A1 | 7/2001 | Ehlers et al. | 702/62 |
| 2002/0072868 A1 | 6/2002 | Bartone et al. | 702/62 |
| 2003/0011486 A1 | 1/2003 | Ying | 340/625.69 |
| 2003/0020333 A1 | 1/2003 | Ying | 307/38 |
| 2003/0050737 A1 | 3/2003 | Osann, Jr. | 700/276 |

FOREIGN PATENT DOCUMENTS

| | | |
|---|---|---|
| JP | 07036559 A * | 2/1995 |
| WO | WO 03/049248 A2 | 6/2003 |

OTHER PUBLICATIONS

Majorpower.com, formally ZZZAP Power; MPD 100R Series; World Wide Web at http://www.majorpower.com/distribution/mpd100r.html, 2 pages, Mar. 9, 2001.Copyright ZZZAP Power Corporation.

Marway Power Systems; Products; MPD 100R Series; World Wide Web at http://www.marway.com/products/mpd100r.html, 3 pages, Apr. 19, 2003; Copyright Marway Power Systems.

Marway Power Systems; Company Info; Application notes; World Wide Web at http://www.marway.com/company/note.html, 3 pages, Mar. 3, 2001; Copyright Marway Power Systems.

Premier Metal Products Company; A.C. Power Distribution and Control Systems; World Wide Web at http://www.pmpwest.com/pproduct.htm, 3 pages, Jan. 18, 2000.

Pulizzi Engineering, Inc. Power Distribution, Control, and Remote Reboot Systems; Dual-Input Auto Switching Systems; World Wide Web at http://pulizzi.com/products/dual.html, 1 page; Feb. 11, 2001; Copyright Pulizzi Engineering, Inc.

Pulizzi Engineering, Inc. Power Distribution, Control, and Remote Reboot Systems; Three Phase Power Controllers; World Wide Web at http://pulizzi.com/products/3phase.html, 3 pages; Feb. 11, 2001; Copyright Pulizzi Engineering, Inc.

Pulizzi Engineering, Inc. Power Distribution, Control, and Remote Reboot Systems; Remote Power Control/Power monitoring Panels/; World Wide Web at http://pulizzi.com/products/rcp.html, 1 page; Apr. 17, 2001; Copyright Pulizzi Engineering, Inc.

Pulizzi Engineering, Inc. Power Distribution, Control, and Remote Reboot Systems; Intelligent Power Controllers; World Wide Web at http://pulizzi.com/products/ipc.html, 2 pages; Feb. 11, 2001; Copyright Pulizzi Engineering, Inc.

Pulizzi Engineering, Inc. Power Distribution, Control, and Remote Reboot Systems; New UL Listed Power Distribution Units; World Wide Web at http://pulizzi.com/products/ul_listed.html, 2 pages; Apr. 8, 2001; Copyright Pulizzi Engineering, Inc.

* cited by examiner

```
OUTLET STATUS:

OUTLET 1        OFF   00.0A ..........
OUTLET 2        ON    00.0A O.........
OUTLET 3        OFF   00.0A ..........
OUTLET 4        OFF   00.0A ..........
OUTLET 5        OFF   00.0A ..........
OUTLET 6        OFF   00.0A ..........
OUTLET 7        OFF   00.0A ..........
OUTLET 8        OFF   00.0A ..........

Main Menu:

0 - Edit Outlet States
    1 - View Logs
    2 - Settings
    3 - Log Out_
```

*FIG. 5*

```
SETTINGS

0 - Time/Date
    1 - Network Settings
    2 - Phone Settings
    3 - Email Settings
    4 - Manage Users_

Settings Help:
 Use arrow keys to select a setting category and press Enter.
 Press Backspace to return to Main Menu.
```

*FIG. 6*

```
MODIFY USER 1

Username: Robert Ricks
        Password: *******
 Retype Password: *******
   Administrator: [x]
User can modify these outlets (Administrators can modify ALL outlets):
 1   2   3   4   5   6   7   8
[x] [x] [x] [x] [ ] [x] [ ] [x]

[SAVE USER]
_____

Modify User Help:
 You MUST choose [SAVE USER] for user settings changes to apply.
 Use arrow keys to navigate.
 Press Enter to change setting.
 Press Backspace to cancel and return to Settings Menu.
```

*FIG. 12*

| OUTLETS | LOGS | | USERS | SETUP | USER:RobRicks 9:20 PM • Thu 10/31/2002 |
|---|---|---|---|---|---|
| | 1 | ● | ON  OFF | Web Server | 0.0A |
| | 2 | ● | ON  OFF | Router | 0.5A |
| | 3 | ● | ON  OFF | Com Sever 1 | 0.0A |
| | 4 | ● | ON  OFF | Com Server 2 | 0.0A |
| | 5 | ● | ON  OFF | Darwin Server | 0.0A |
| | 6 | ● | ON  OFF | Hub #1 | 0.0A |
| | 7 | ● | ON  OFF | Accounting 1 | 0.0A |
| | 8 | ● | ON  OFF | Room Camera | 0.0A |
| | | | | Total | 0.5A |

*FIG. 13*

☑ Enable Scheduling for Outlet: 1

New event: [Turn outlet ON ▼] at [12] : [00] [AM ▼], every [Sunday ▼]   [Add Event]

Schedule: [Save Schedule Options]   [Cancel]

✗ ● Sunday 12:00 A.M. - Turn Outlet ON

*FIG. 14*

Outlet Label: [OUTLET 1]

■ Enable Low Current Alerts
Low Current (Amps):   Low Grace Period(ms):
[0.3]                 [10000]

■ Enable High Current Alerts
High Current (Amps):  High Grace Period(ms):
[20]                  [10000]

[Save Properties]                    [Cancel]

*FIG. 15*

|  |  |  |  | USER:RobRicks |
|---|---|---|---|---|
| OUTLETS | LOGS | USERS | SETUP | 8:49 PM • Thu 10/31/2002 |

```
<134>Oct 31 20:49:32 198.144.195.110 RobRicks turned outlet(s) 7 off from 63.201.59
<134>Oct 31 20:49:30 198.144.195.110 RobRicks turned outlet(s) 5 off from 63.201.59
<134>Oct 31 20:49:30 198.144.195.110 RobRicks turned outlet(s) 3 off from 63.201.59
<134>Oct 31 20:49:29 198.144.195.110 RobRicks turned outlet(s) 1 off from 63.201.59
<134>Oct 31 20:48:08 198.144.195.110 admin1 turned outlet(s) 4 on from 63.201.59.24
<134>Oct 31 20:48:06 198.144.195.110 admin1 turned outlet(s) 3 on from 63.201.59.24
<134>Oct 31 20:48:05 198.144.195.110 admin1 turned outlet(s) 2 on from 63.201.59.24
<134>Oct 31 20:48:04 198.144.195.110 admin1 turned outlet(s) 1 on from 63.201.59.24
<134>Oct 31 20:47:45 198.144.195.110 admin1 turned outlet(s) 4 off from 63.201.59.2
<134>Oct 31 20:47:44 198.144.195.110 admin1 turned outlet(s) 3 off from 63.201.59.2
<134>Oct 31 20:47:43 198.144.195.110 admin1 turned outlet(s) 2 off from 63.201.59.2
<134>Oct 31 20:47:42 198.144.195.110 admin1 turned outlet(s) 1 off from 63.201.59.2
```

*FIG. 16*

|  |  |  |  |  |  |  |  |  |  |  |  | USER:admin1 |
|---|---|---|---|---|---|---|---|---|---|---|---|---|
| OUTLETS | LOGS | USERS | SETUP |  |  |  |  |  |  |  |  | 8:46 PM • Thu 10/31/2002 |

|  |  | Outlet Permissions |  |  |  |  |  |  |  |  |  |
|---|---|---|---|---|---|---|---|---|---|---|---|
| Username | Administrator | 1 | 2 | 3 | 4 | 5 | 6 | 7 | 8 |  |  |
| 1. admin1 | ● | ● | ● | ● | ● | ● | ● | ● | ● | Edit | Delete |
| 2. RobRicks | ● | ● | ● | ● | ● | ● | ● | ● | ● | Edit | Delete |
| 3. <empty> |  |  |  |  |  |  |  |  |  | Edit | Delete |
| 4. <empty> |  |  |  |  |  |  |  |  |  | Edit | Delete |
| 5. <empty> |  |  |  |  |  |  |  |  |  | Edit | Delete |
| 6. <empty> |  |  |  |  |  |  |  |  |  | Edit | Delete |

*FIG. 17*

| | | | | | | | |
|---|---|---|---|---|---|---|---|
| Username | | | Ron Silorio | | | | |

Password: ********
Retype Password: ********

■ User is administrator

User may modify these outlets:
(administrators can modify all outlets regardless of these settings)

| 1 | 2 | 3 | 4 | 5 | 6 | 7 | 8 |
|---|---|---|---|---|---|---|---|
| ☑ | ☑ | ■ | ■ | ■ | ■ | ■ | ■ |

Save User     Cancel

*FIG. 18*

☑ Enable SNMP
■ Use Concatenated Username&Password as Communities
(Communities 1 & 2 below will be ignored)

Community 1: public    ■ write access
    Community 2: private    ☑ write access
    Trap Host IP:
    (Leave blank to disable traps)

Save      Cancel

*FIG. 24*

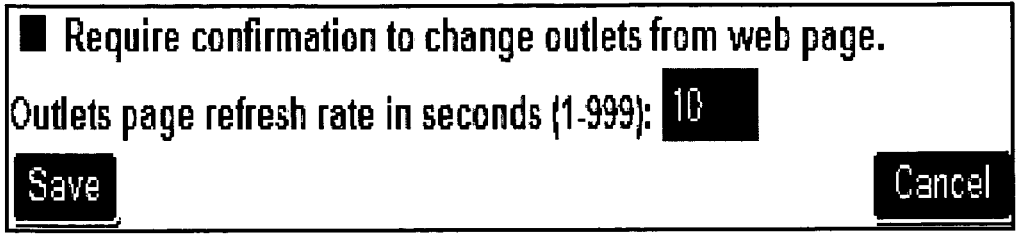

*FIG. 25*

```
OUTLETS      LOGS      USERS      SETUP          USER:admin
                                                 8:46 PM • Thu 10/31/2002

TIME/DATE        Edit

Thu, 31 Oct 2002 • 8:46 PM
      Time Zone: GMT-08:00
Daylight Savings: Enabled

NTP: Disabled
   NTP Server 1: 255.255.255.255
   NTP Server 2: my.NTP.server

NETWORK          Edit

MAC Address: 00-09-E6-00-01-17
           DHCP: Disabled

DEFAULTS              ACTIVE
             IP: 198.144.195.110       198.144.195.110
    Subnet Mask: 255.255.255.248       255.255.255.248
        Gateway: 198.144.195.105       198.144.195.105
            DNS: 198.144.192.2         198.144.192.2
           Host: DUALCOM-8-1           DUALCOM-8-1
         Domain: ???.com               ???.com LOGGING          Edit Syslog Server: 255.255.255.255
 Logging Facility: 16
    Logging Level: 6

Email Logs: Don't dump logs to email when buffer is full
     SMTP Server: smtp.???.com
             To: administrator@???.com
           From: DUALCOM-8@???.com
        Subject: DUALCOM-8 Log Dump SNMP             Edit
```

*FIG. 19*

| | |
|---|---|
| IP: | 192.168.1.1 |
| Subnet Mask: | 255.255.255.0 |
| Gateway: | 192.168.2.1 |
| DNS: | 192.168.1.1 |
| Host: | TRICOM-8-1 |
| Domain: | domain.com |

[Save]  [Cancel]

Note: Network settings won't take affect until you reboot.

[Save and Reboot]

Warning: If you choose "Save and Reboot", first power down all attached devices as rebooting will temporarily affect outlet states.

*FIG. 20*

☑ Enable Interface
■ Allow callers with no caller ID.
Phone PIN: **************

[Save]  [Cancel]

*FIG. 21*

☑ Dump logs to email when buffer is full.

| | |
|---|---|
| SMTP Server: | smtp.domain.com |
| To: | admin@domain.com |
| From: | TRICOM-8@domain.com |
| Subject: | TRICOM-8 Log Dump |

[Save]                                                    [Cancel]

*FIG. 22*

☑ DCHP Enabled

| | |
|---|---|
| IP: | 192.168.1.0 |
| Subnet Mask: | 255.255.255.0 |
| Gateway: | 192.168.1.1 |
| DNS: | 192.168.1.1 |
| Host: | DUALCOM-8-1 |
| Domain: | domain.com |

[Save]                                                    [Cancel]

Note: Network settings won't take affect until you reboot.

[Save and Reboot]

Warning: If you choose "Save and Reboot", first power down all attached devices as rebooting will temporarily affect outlet states.

*FIG. 23*

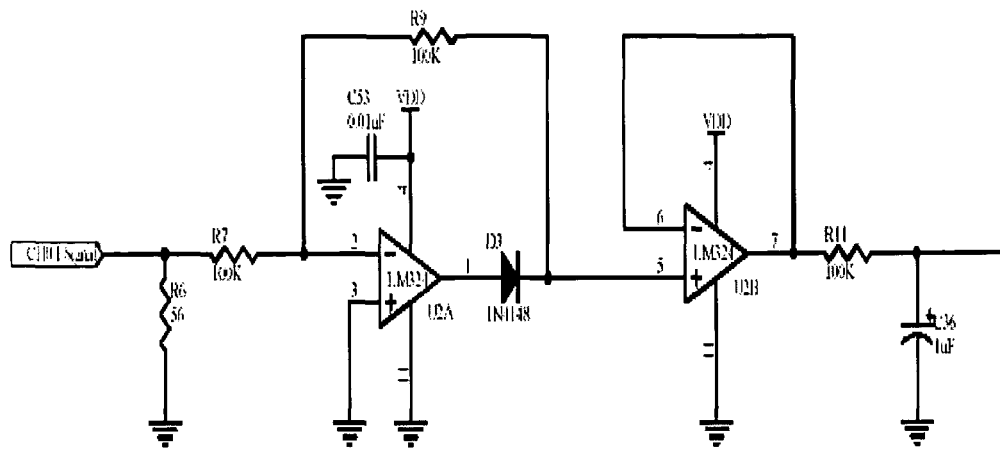
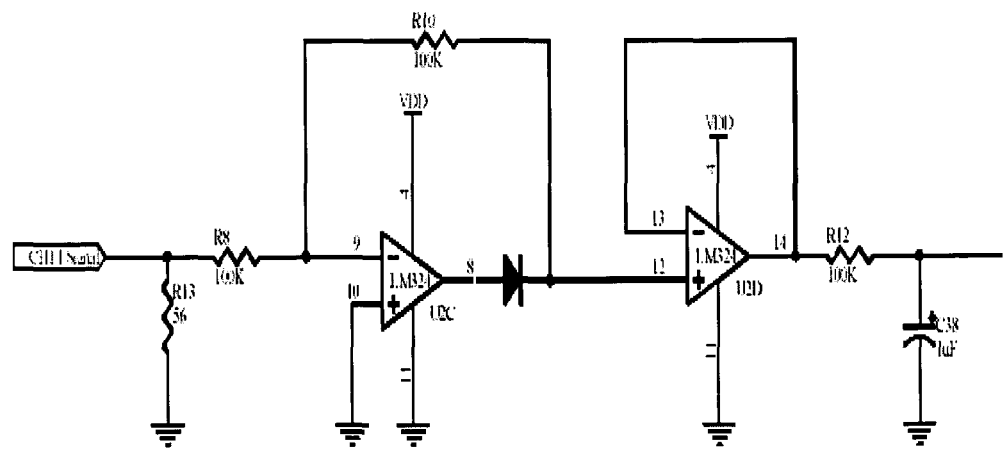
*FIG. 28A*

METHOD AND APPARATUS FOR REMOTE POWER MANAGEMENT AND MONITORING

CROSS REFERENCE TO RELATED APPLICATIONS

This application is a continuation-in-part of U.S. patent application Ser. No. 10/431,333 filed 6 May 2003 which claims priority from provisional patent application 60/378,342, filed 6 May 2002 and incorporated herein by reference.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

This invention relates to electronic circuits. More particularly, the invention relates to a method and apparatus for intelligent power supply devices and/or methods that can be used for power supply control and/or monitoring in various information and/or network appliances.

BACKGROUND OF THE INVENTION

Early in the development of modern networking equipment such as routers, it was realized that at times a particular piece of network equipment might hang or "crash." In such instances, a human operator often had to intervene by traveling to the location of the equipment and rebooting or power cycling the equipment in order to get that particular piece of equipment working. Power cycling and information about consumed power are also of interest in a number of computer equipment and other equipment settings.

A number of proposals and techniques exist for performing various types of "power management" in computer systems, such as various APX (Automated Power Exchange) power management schemes. These techniques are generally characterized by fixed operating modes, such as suspend, sleep, hibernate, etc. and either no communication or limited communication with other power management components. Furthermore, computer equipment generally includes one or more "power management" schemes, but these also are of limited functionality.

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

SUMMARY OF THE INVENTION

The present invention relates to a method and/or system and/or apparatus for providing new capabilities in power supply and/or power cycling management, particularly use of such techniques integrated within an information and/or network appliance. In specific embodiments, the invention involves a method and/or system and/or apparatus for remotely managing and monitoring power supply and/or consumption over one or more interfaces including, for example, a telephone interface and/or a network-based (e.g., HTTP, SNMP) interface and/or a serial interface. In further embodiments, the invention involves one or more methods that may be implemented in and/or using a data handling device or system, such as a computer or other information enabled device. In further embodiments, the invention involves methods and/or systems for power management over a communication network and/or telephone network.

Various strategies have been proposed for performing remote power switching and/or management and/or performing intelligent scheduling for power cycling. According to specific embodiments, the present invention is involved with methods and/or systems and/or devices that can be used together or independently to monitor and/or control power in different network and/or information appliances. In specific embodiments, the present invention can be understood as involving new methods related to power management of information appliances.

An internal smart power supply and/or monitor according to specific embodiments of the invention further includes one or more novel features such as: individual current monitoring of power outputs; user adjustable stagger starting and/or output power scheduling; and optional menu driven interfaces.

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of an apparatus or system operating on or with access to a digital data network. This should not be taken to limit the invention, which, using the teachings provided herein, can be applied to other situations, such as cable television networks, wireless networks, etc. Furthermore, in some aspects, the present invention is described in terms of client/server systems. A number of computing systems and computing architectures are described in the art as client/server art. For the purposes of this description, client/server should be understood to include any architecture or configuration wherein an element acting as a client accesses a remote and/or separate program or device that is providing the desired service (e.g., a server).

All references, publications, patents, and patent applications cited herein are hereby incorporated by reference in their entirety for all purposes.

BRIEF DESCRIPTIONS OF THE DRAWINGS

FIG. 5 is a block diagram illustrating an example initial interface and method according to specific embodiments of the present invention.

FIG. 6 is a block diagram illustrating an example settings interface and method according to specific embodiments of the present invention.

FIG. 12 is a block diagram illustrating an example user modification interface and method according to specific embodiments of the present invention.

FIG. 13 is a block diagram illustrating an example initial web-based interface and method according to specific embodiments of the present invention.

FIG. 14 is a block diagram illustrating an example output scheduling interface and method according to specific embodiments of the present invention.

FIG. 15 is a block diagram illustrating an example output label and properties modification interface and method according to specific embodiments of the present invention.

FIG. 16 is a block diagram illustrating an example logging interface and method according to specific embodiments of the present invention.

FIG. 17 is a block diagram illustrating an example user interface and method according to specific embodiments of the present invention.

FIG. 18 is a block diagram illustrating an example user modification interface and method according to specific embodiments of the present invention.

FIG. 19 is a block diagram illustrating an example web-based setup interface and method according to specific embodiments of the present invention.

FIG. 20 is a block diagram illustrating an example network identification interface and method according to specific embodiments of the present invention.

FIG. 21 is a block diagram illustrating an example telephone setup interface and method according to specific embodiments of the present invention.

FIG. 22 is a block diagram illustrating an example logging setup interface and method according to specific embodiments of the present invention.

FIG. 23 is a block diagram illustrating an example date/time setup interface and method according to specific embodiments of the present invention.

FIG. 24 is a block diagram illustrating an example SNMP setup interface and method according to specific embodiments of the present invention.

FIG. 25 is a block diagram illustrating an example options setup interface and method according to specific embodiments of the present invention.

Figure 28B:
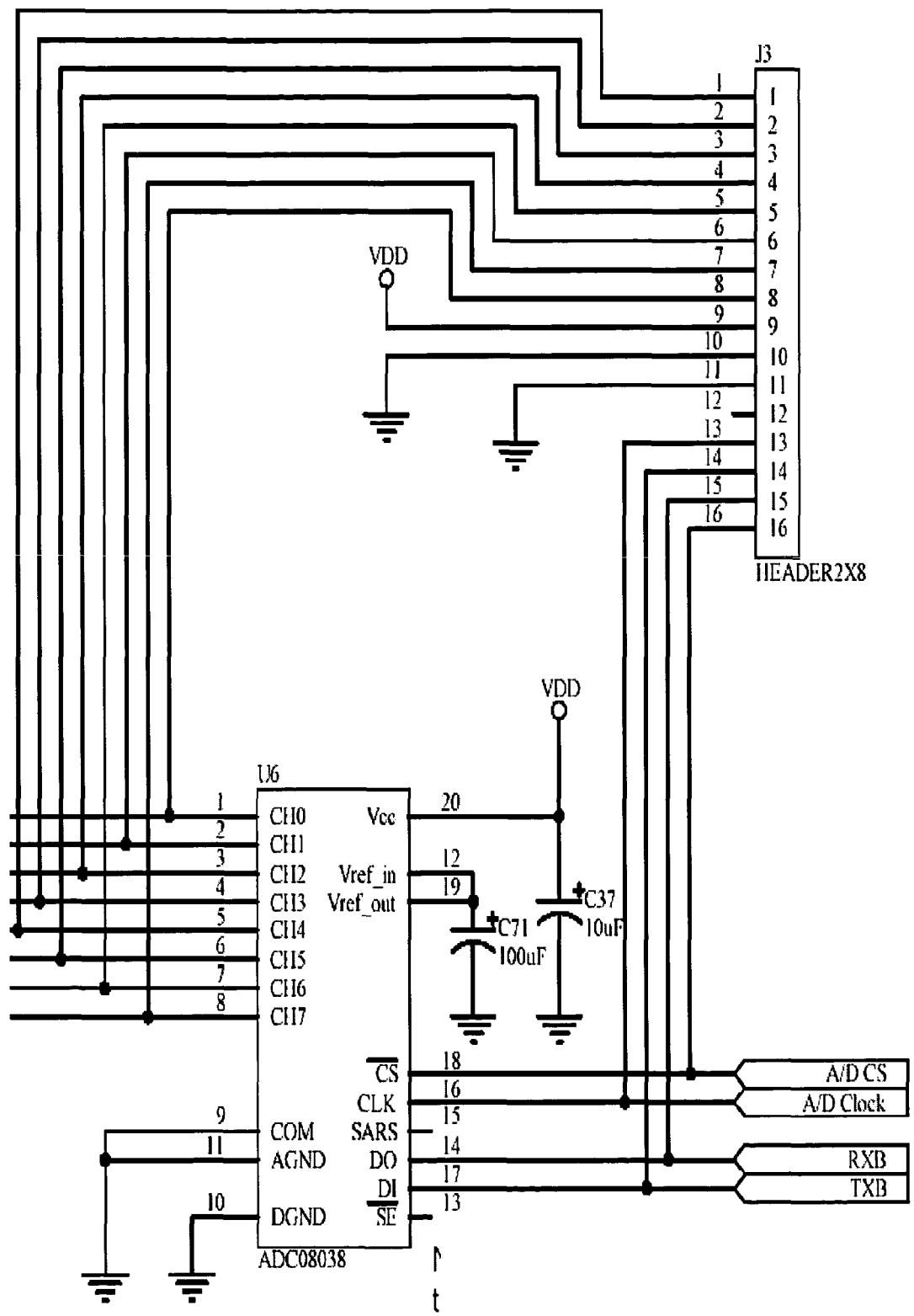

FIG. 28A-B are a block diagrams illustrating details of three current sensors of an example configurable power supply according to specific embodiments of the present invention.

DESCRIPTIONS OF SPECIFIC EMBODIMENTS

According to specific embodiments, the present invention can be embodied into an example information and/or network appliance or apparatus. These components are at times referred herein to as the SPMM (Smart Power Monitor/Manager)™ power supply manager. In specific embodiments, a power supply manager according to specific embodiments of the invention can include or be configured to operate with different interfaces, such as, for example, network, serial, and/or telephone. Such embodiments may provide various power monitoring and/or control options from within an information appliance including one or more monitoring and/or control options provided by an Smart Power Switch as discussed in above referenced patent applications.

1. Embodiment in an Information Appliance

Figure 1:
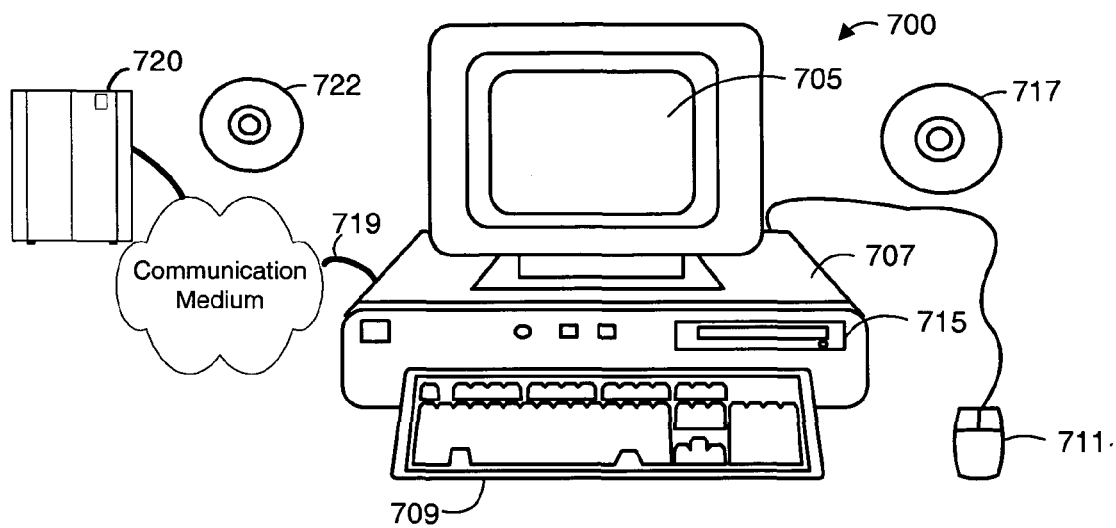
FIG. 1 is a block diagram showing two representative example information appliances in which various aspects of the present invention may be embodied.

FIG. 1 is a block diagram showing two representative example information appliances in which various aspects of the present invention may be embodied. As will be understood to practitioners in the art from the teachings provided herein, various aspects of the invention can be implemented in hardware and/or software, though a typical embodiment will include both hardware and software components. In some embodiments of the invention, different aspects of the invention can be implemented in either client-side logic or server-side logic or can be implemented in logic integral to hardware components of the invention or software that is supplied and executed separately from hardware components of the invention. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 1 shows an information appliance (or digital device) 700 that may be understood as a logical apparatus that can read instructions from media 717 and/or network port 719, which can optionally be connected to server 720 having fixed media 722. In specific embodiments, information appliance (or digital device) 700 and/or server 720 have included as components therein power monitoring and/or management circuits according to specific embodiments of the invention and as discussed herein. Apparatus 700 can use instructions stored on media 717 or from elsewhere to direct server or client logic, as understood in the art, to embody aspects of the invention as described herein.

One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in part as software recorded on this fixed media. Communication port 719 may also be used to initially receive instructions that are used to program such a system and may represent any type of communication connection. Communication port 719 may also be used to transmit power monitoring and/or control data as further described herein.

The invention also may be embodied in whole or in part within the circuitry of an application specific integrated circuit (ASIC) or circuits or a combination of such devices and/or programmable logic devices (PLD) in combination with one or more power control and/or monitoring circuits as described herein. Aspects of the invention may be embodied in a computer understandable descriptor language, which may be used to create an ASIC, or PLD that operates as herein described.

Figure 2:
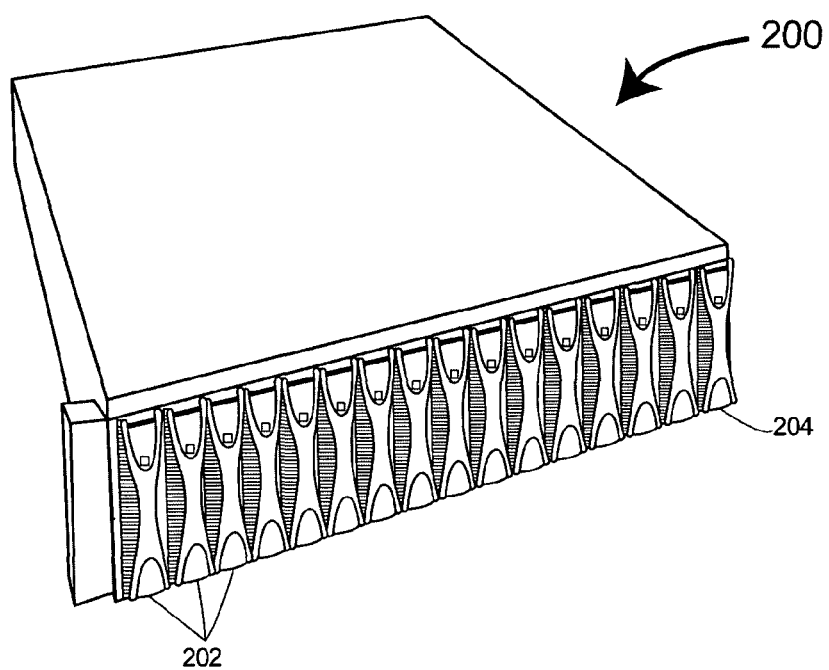
FIG. 2 is a block diagram illustrating an example blade server system in which various aspects of the present invention may be embodied.

Another example information system in which the invention may be embodied is as shown in FIG. 2. FIG. 2 is a block diagram illustrating an example blade server system in which various aspects of the present invention may be embodied. Blade systems are generally understood in the art to be communication processing or other information appliances comprising a number of "blades" such as 202. A blade is generally understood in the art as being a removable processor board in such a system that provides an information processing function, such as data routing. According to specific embodiments of the invention, one or more blades in such a system, such as 204, are provided with SPMM components and/or functions as described herein. Such components and/or functions can provide power management and/or monitoring to one blade or several blades in such a system.

2. Example Separable Board Embodiments

Figure 3:
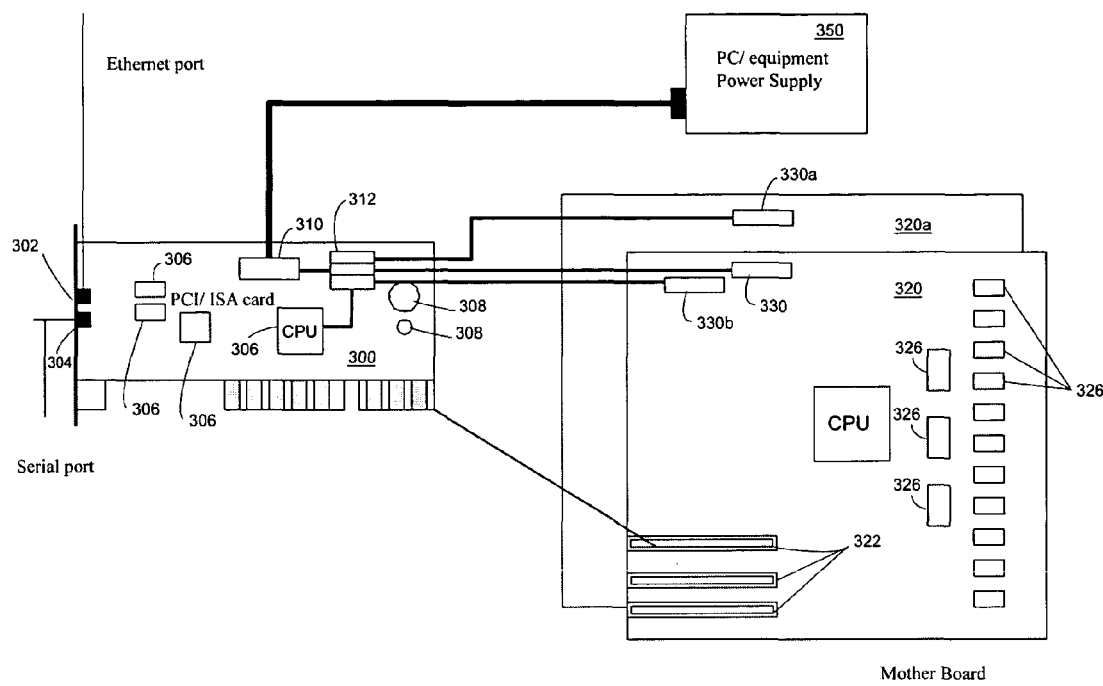
FIG. 3 is a block diagram illustrating an example separable board with a smart power management component according to specific embodiments of the present invention.

FIG. 3 is a block diagram illustrating an example separable board with a smart power management component according to specific embodiments of the present invention. In further embodiments, power control and/or monitoring according to specific embodiments of the invention circuitry can be included in a separable card or board that is attached to a bus and/or backplane and/or rack and/or motherboard (e.g., PCI slot 302) in an information appliance. Examples of such separable cards include, for example, a bus card 300 in a PC or workstation or network server. Examples of such separable cards can also include a "blade" card (e.g., 202 or 204 in FIG. 2) in a blade server system (e.g., 200 in FIG. 2). In these embodiments, for operation such a card is generally connected to other information circuits using a bus or backplane. Power is routed to the card from an appropriate source, such as an existing information appliance or rack power supply (e.g., 350).

In a specific embodiment, such a card will generally have a power connector for receiving power (e.g., 310) and one or more relays and/or monitors and/or connectors (e.g., 312) for providing power to system circuits, such as a motherboard (e.g., 320) and/or other boards or circuits (e.g., optional additional board 330a). Other power connectors can be included on such a card for use in systems with redundant power supplies.

Connector/relay/monitors 312 are circuit element that will be further understood from the detailed description below. This element can be constructed in a number of different ways, as will be understood in the art. Generally, 312 will provide components to provide a current on/off relay under control of logic components such as 306 and/or provide a current monitoring function. Both control and monitor data can be communicated according to specific embodiments of the invention over one or more communication connectors, such as 302 and/or 304.

In further embodiments, such a Card can have one or more interface connections, such as a serial or USB port 304 and/or an Ethernet port 302. In a PC embodiment, for example, the Ethernet port could also serve as the PC's main network port. Where a communication interface is provided on the Card, because the logic components (e.g., example components 306) of the card is not dependent on the information appliance in which the card resides, a user can communicate with the card and perform power management tasks such as reboot, monitor current, set alerts, etc., even when power to the main board (e.g., 320) is turned off or one or more processors on the main board hangs.

In further embodiments, a Card according to specific embodiments of the invention can use one or more interfaces elsewhere provided by the appliance, however this can represent a less preferred embodiment in that the board will not have communication access when power is not supplied to the appliance.

According to specific embodiments of the invention, various reset connections (e.g., a Mother Board's reset connection) within the appliance can be connected to the card. This provides a solution to the problem of a remote server locking up and the user is not able to communicate to it, for example a problem commonly found with KVM (Keyboard, Video, Mouse) over IP solutions.

It will be further understood that a configuration such as shown in FIG. 3 can represent any number of different accessory card configurations. Accessory cards are generally known to have some type of on-board logic circuitry, as represented by example components 306. These outlines represent any type of logic and/or electronic component, including but not limited to random access memory (RAM), programmable and/or erasable and/or read only memory (E/P/ROM), various custom and or standard IC components, or programmable logic devices (PLDs) generally without limit. The only limiting characteristic according to specific embodiments of the invention is that independent logic circuits on the card have sufficient stand-alone logic handling ability in order to communicate status and/or receive commands regarding power status when plugged into motherboard 320 even when all or most logic circuitry on mother board 320 is not functioning correctly. This allows card 300 to provide power usage information and take programmed action or command initiated action independently of any logic functions on mother board 320. Such standalone functionality can be provided by a stored-program processor, such as a microprocessor or CPU, residing on card 300 running logic instructions stored in components on card 300 or alternatively by custom hard-wired logic circuits. General logic methods that can be implemented on such circuits will be understood from discussion elsewhere herein.

It should be understood that PCI or ISA cards are only example possible form factors. Such a device can also be a blade in a blade server environment which, depending on the blade system implementation, can allow the possibility to control the main power and all of the other blades as well. Blade servers as known in the art are computing devices, combining the majority of server hardware, such as CPU, memory and network connections, onto a single expansion card (a blade). Due to their compact size, multiple blade servers can be placed in a single server rack, chassis or enclosure, allowing numerous systems to share electricity and HVAC resources.

3. Example On-Board Embodiments

Figure 4:
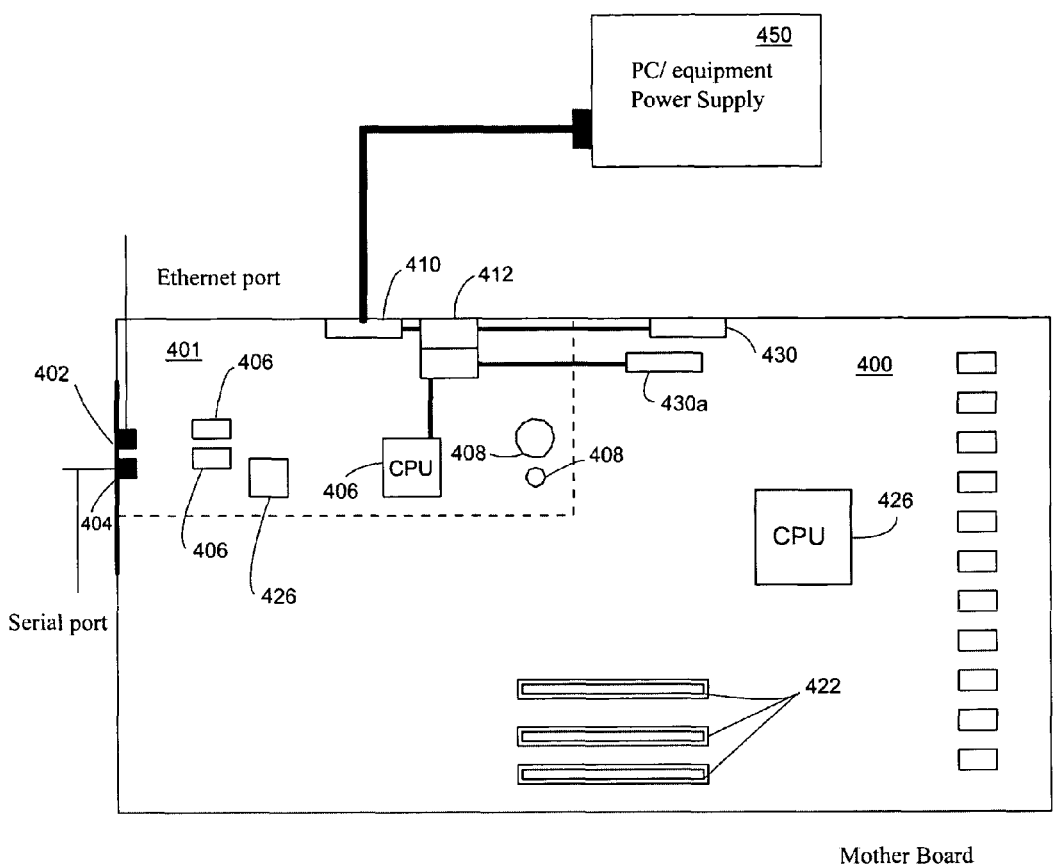
FIG. 4 is a block diagram illustrating an example main (mother) board with smart power management components according to specific embodiments of the present invention.

In further embodiments, power control and/or monitoring according to specific embodiments of the invention can be provided by circuitry located directly or in close proximity of one or more principal components of an information appliance, such as directly on a motherboard of a PC, server, workstation, etc., on a daughter-board of such appliance, or on or closely associated with a power supply circuit itself. FIG. 4 is a block diagram illustrating an example main (mother) board with smart power management components according to specific embodiments of the present invention.

In specific embodiments, power control monitoring functions can be configured to be an integral part of a mother board or power supply circuitry (e.g., 400) and will also generally have one closely connected interface communication connections, such as a USB or serial port 404 and/or an Ethernet port 402. In such embodiments, for example, a communication connection can be configured so that power to that connection will remain connected while power to the remainder of the mother-board or information appliance is monitored or cycled on or off. With a communication interface provided that can maintain power while the remainder of the card is disconnected, a user can communicate with the power control components and do things such as reboot, monitor current, set alerts, etc., even when power to appliance is turned off or one or more processors on the information appliance hangs. In this embodiment, power circuitry on the card is essentially divided into at least two "domains": one that sits outside controlled power connector 430 and/or optional power connector 430a. The other domain is represented in the figure by the dotted outline and indicated as 401. This domain is "inside" or "behind" the controlled power connector and is characterized by having its power be independent of the power domains that are controlled and/or monitored by SPMM relay/monitor components 412. This allows the SPMM functions to work and communicate even when other parts of the mother board become inactive and during any power cycling provided by 412.

4. Interfaces

According to specific embodiments of the present invention, one or more interfaces are associated with the power control and/or management components and can utilize one or modes of communication. For example, an SPMM can be accessed via serial, Ethernet or direct phone. These interfaces can provided either identical functionality or functionality can vary for different interfaces. For example, through the serial and Ethernet interfaces a user can determine and change the state of each controlled power output (e.g., 330 or 430), determine the amount of current that each output is drawing, and add or modify scheduled on/off events on outputs. In specific embodiments, all of these functions can be performed in real time.

Interfaces

According to specific embodiments of the present invention, a serial interface uses a standard serial port protocol, so that any information devices (e.g., a laptop, personal computer, or digital controller) with an available corn or com-like port can use this direct connection to an SPMM. The serial port can also be used as an initial setup port for the unit. The serial interface can also be an USB-type serial interface.

Ethernet and Network Interface

According to specific embodiments of the present invention, an Ethernet port can be utilized either through a text based Telnet session or through an HTTP web interface. The telnet session is similar to the serial interface in that its text based and the menus can generally be very similar or identical. A web interface according to specific embodiments of the invention can, for example, utilize a web browser and the Hypertext Transfer Protocol (HTTP). According to specific embodiments of the present invention, this interface looks and feels different from the others because it is a GUI (graphical user interface). An SNMP (Simple Network Management Protocol)interface can be used to control various settings and retrieve various information from an SPMM using a standard network management protocol, such as SNMP.

One or more of the above interfaces may require some type of setup before they are used. However, according to specific embodiments of the invention, at least one conveniently accessible interface, e.g., an Ethernet interface, is optionally designed to have some communication functions without initialization.

Email Interface

In addition, an SPMM can be configured to email logged events. When this feature is enabled, according to specific embodiments of the present invention, a running log of events is kept and once memory is filled, the log file is sent to a designated email address. Logs can contain information such as the user name, which outputs were changed, time and date of event, and interface and or IP address used. In various embodiments, all of the logic necessary to provide this functionality may be provided on the Card on the SPMM on-board logic. In other embodiments, this functionality may be provided by logic running on a processor of an information appliance being managed.

Telephone Interface

According to specific embodiments of the present invention, a telephone interface can use a standard analog phone line. This interface is unique in that it uses a few inexpensive parts (such as, for example, a Clare™ CPC5620A as the data access arrangement and a Sunplus™ SPC122a as the voice processor) along with a few other parts. An SPMM according to specific embodiments of the present invention has DTMF (Dual-tone multi-frequency) decoding, caller id, and voice feedback. Once enabled and attached to a phone line, the unit is now ready to receive and process calls. An SPMM can be set to accept all calls, block calls without caller ID enabled, or not accept any incoming calls. An SPMM is designed so that if a user uses the phone interface he or she is greeted with a voice prompted menu. The unit will ask for a numeric pass code and then prompt the user for the next command. In specific embodiments, though an SPMM has a voice prompted menu, it will only respond to (DTMF) telephone tones as commands and not to speech. In further embodiments, speech recognition can be included in a device according to the invention. This interface may optionally not be provided particularly in on-board implementations where it is desirable to reduce the total amount of logic circuitry of an implementation.

Interface Features and Functions

According to specific embodiments of the present invention, the serial and/or Ethernet interfaces have the ability to:

change the state of output(s)
assign output labels
assign output schedule
edit and assign users
edit network, email, and phone interface settings.

A wide variety of configurations are possible according to various specific embodiments of the present invention. Some of these configurations are described herein as examples of the invention. Various configuration details are also elements in novel embodiments of the invention.

According to specific embodiments of the present invention, different features may be accessible from different interfaces. Table 1 below provides an example feature set indicating particular interfaces according to specific embodiments of the present invention.

TABLE 1

|  | TCP/IP-WEB | TCP/IP-TELNET | TCP/IP-SNMP | SERIAL | PHONE |
|---|---|---|---|---|---|
| Switch output(s) on and off | Y | Y | Y | Y | Y |
| Monitor output(s) on and off status | Y | Y | Y | Y | Y |
| Monitor output(s) current consumption | Y | Y | Y | Y | N |
| Program output schedules | Y | N | Y | N | N |
| Protect with Password/PIN security | Y | Y | Y | Y | Y |
| Control output access with users and passwords | Y | Y | Y | Y | N |
| Manage users | Y | Y | Y | Y | N |

5. Per Output Current Monitoring

According to specific embodiments of the invention, the invention provides per-output current monitoring for one or more controlled outputs. In particular embodiments, this novel feature is integrated into the user interfaces as provided herein. Per-output current monitoring according to specific embodiments of the invention pro vides a mechanism of remotely managing current load on a individual device basis.

6. User-Controllable Scheduling

According to specific embodiments of the invention, the invention features user-controllable scheduling of one or more outputs. While other power devices have provided various staged power up operation, the present invention allows a user to flexibly manage scheduling features.

7. Detailed Interface Examples and Operation

Many different particular arrangements of menus and functions are possible according to specific embodiments of the invention. In order to provide a complete description of example methods of operation according to specific embodiments of the invention, the following describes specific example menus and methods of one or more systems according to the invention.

Example Connection Interfaces

In specific embodiments, the invention includes a set of interfaces for a text-based interface for example using a direct serial connection. The discussion below and the referenced figures provide specific example embodiments of such interfaces.

Initialize:

FIG. 5 provides an example of an initial serial interface screen. An example configuration and method of this screen is as follows. Using for example an appropriate serial cable attached between an SPMM according to specific embodiments of the invention and an information screen, such as a terminal or PC, start a Hyper Terminal type session. For example, a connection can be made to COM 1 with the settings: 19200 bit rate, 8 data bits, parity=none, stop bits=1, and Flow control=none. Once connected, log on with a user name and password. Once logged in type 0 for editing output states, 1 to view logs or 2 to edit settings.

Edit Settings

FIG. 6 provides an example settings menu according to specific embodiments of the invention. In the settings menu a user can set such things as Time/Date, Network Settings, E-mail Settings, and Manage Users. For example, to edit a category a user can use arrow keys or a mouse to select the category or type a corresponding number or letter for the listed function. Note that in some embodiments, either the network settings or phone setting may not be present.

Figure 7:
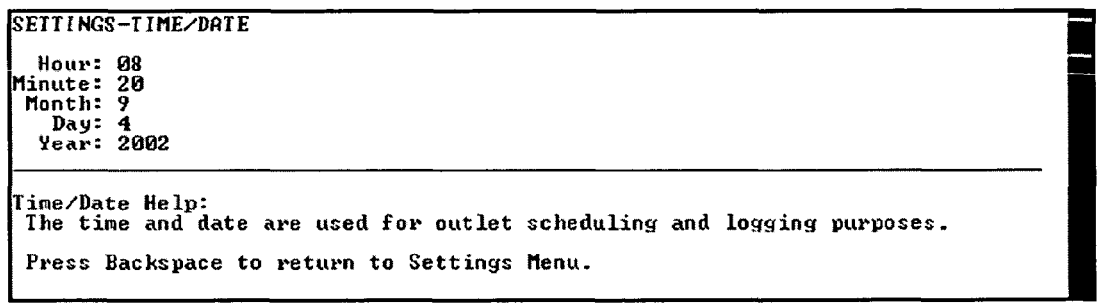
FIG. 7 is a block diagram illustrating an example time/date interface and method according to specific embodiments of the present invention.

Settings Time/Date:

FIG. 7 provides an example time/date settings menu according to specific embodiments of the invention. This interface can be used by, for example, scrolling to the proper heading and pressing enter to change a value and once the values have been changed press enter to finalize.

Figure 8:
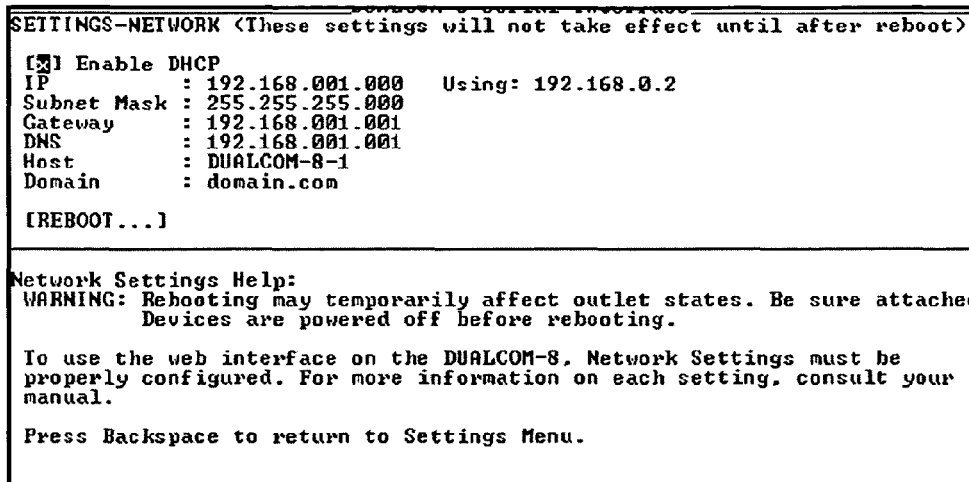
FIG. 8 is a block diagram illustrating an example network interface and method according to specific embodiments of the present invention.

Settings Network:

FIG. 8 provides an example network settings menu according to specific embodiments of the invention. This interface can be used by, for example, scrolling to the proper heading and pressing enter to change a value and once the values have been changed press enter to finalize. This procedure may be repeated for all network settings. Network settings can include such things as values for IP addressing, host and/or domain names, enablement of DHCP (Dynamic Host Configuration Protocol), SNMP, or other functions, etc. In various embodiments, an SPMM according to specific embodiments of the invention may have a separate IP or other network address from the information appliance to which it is connected. In other embodiments, an SPMM may have a separate port ID assignment or other assignment and otherwise use the network address from its connected information appliance.

According to specific embodiments of the invention, seven settings are provided here: Enable DHCP (This is set to on as default so that if there is a DHCP server an SPMM will get it's IP address from it. If so it will show up under the Using: section and it will be different than 192.168.1.2 [the default if no DHCP Server is found].); IP; Subnet Mask; DNS; Gateway; Host; and Domain.

Figure 9:
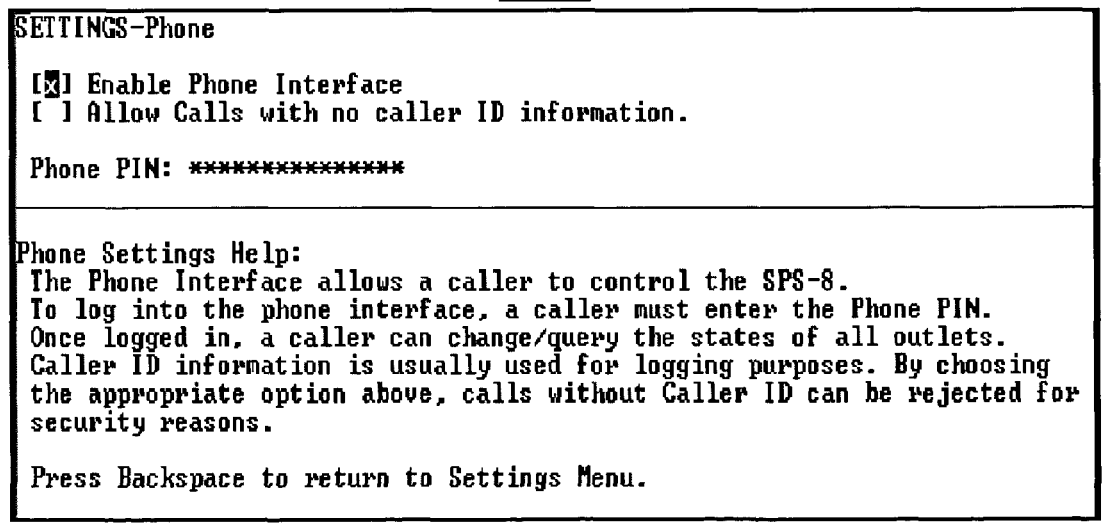
FIG. 9 is a block diagram illustrating an example telephone interface and method according to specific embodiments of the present invention.

Settings Telephone:

FIG. 9 provides an example telephone settings menu according to specific embodiments of the invention. This interface can be used by, for example, scrolling to the proper heading and pressing enter to change a value. Telephone settings can include such things as values for a phone personal identification number (PIN) and/or enablement of various telephone functions. In embodiments without a telephone interface, this menu may not be available.

Figure 10:
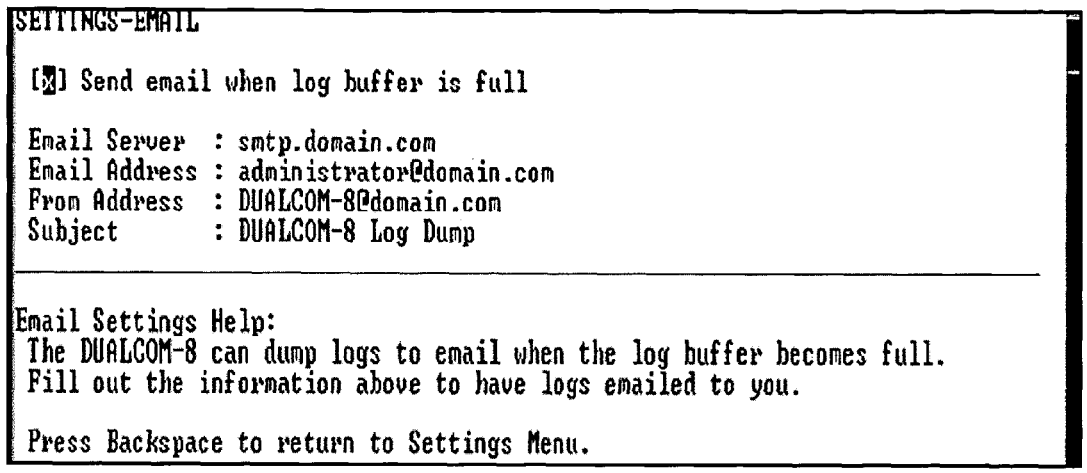
FIG. 10 is a block diagram illustrating an example email interface and method according to specific embodiments of the present invention.

Settings Email:

FIG. 10 provides an example email settings menu according to specific embodiments of the invention. This interface can be used by, for example, scrolling to the proper heading and pressing enter to change a value. Email settings can include such things as values for an email address and/or server and/or email heading values and/or enablement of various email functions. In embodiments without an email interface, this menu may not be available.

Figure 11:
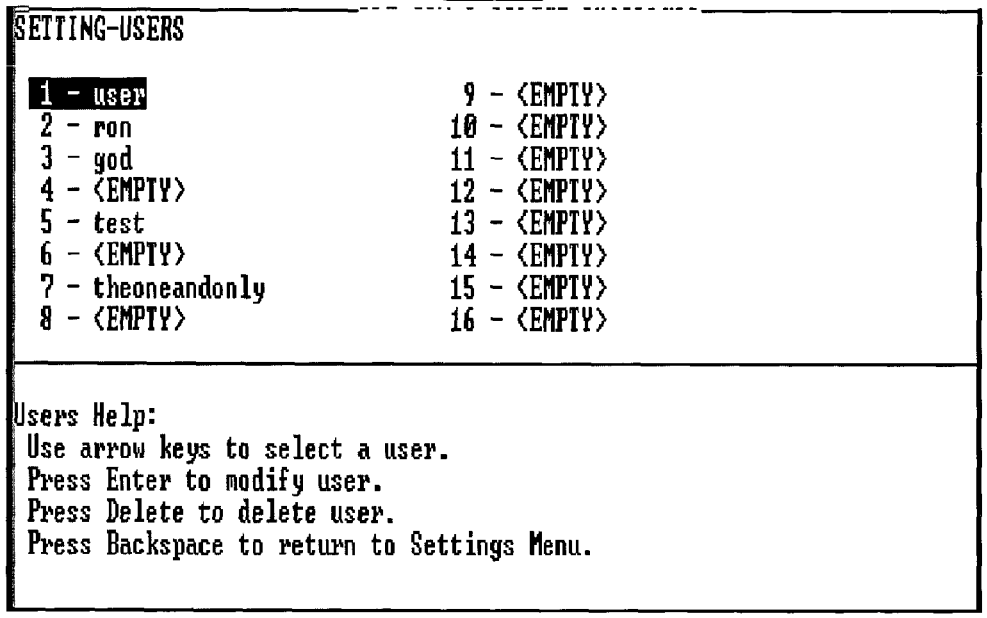
FIG. 11 is a block diagram illustrating an example user settings interface and method according to specific embodiments of the present invention.

Settings Users:

FIG. 11 provides an example initial user settings menu and FIG. 12 provides an example user modification settings menu according to specific embodiments of the invention. This interface can be used by, for example, scrolling to the proper heading and pressing enter to change a value. User settings can include such things as user names, passwords, administrator indications, permissions. Permissions can include individual output modification permissions.

Example Web Connection Interfaces

In specific embodiments, the invention includes a set of interfaces for a web-based connection. The discussion below and the referenced figures provide specific example embodiments of such interfaces. Once a network port (such as Ethernet) has been configured with the proper addressing, a user can access a SPMM according to specific embodiments of the present invention through such things as a telnet session or through a web browser. According to specific embodiments of the invention, the Telnet session is text based and menu driven and has the same look and feel as the serial connection described above. A web interface is optimized for use in all web browsers, such as Internet Explorer.

To begin using the web interface, start a web browser and input an SPMM's network identification (e.g., an IP and/or domain name address) Once found, an example SPS can prompt for a log on, for example using a popup window requesting a user name and password or alternatively, by retrieving saved passwords.

FIG. 13 provides an example of web-based interface screen according to specific embodiments of the invention. This example figure shows a number of different possible functionalities according to specific embodiments of the invention.

For example, the four underlined links at the top of the interface can have the following functions:

OUTPUTS: change the state of outputs, setup scheduling, rename outputs and view current draw (e.g., amperage) per output.

LOGS: shows previous events (e.g., the last 30) that have occurred.

USERS: add, edit and delete users to the unit

SETUP: network, time/date and preference settings. Generally, only users with administrator privilege's can access the setup and users tabs.

According to specific embodiments of the invention, output management can be handled as follows. To change the state of any output a user can simply click the output indication ON or OFF. Thus, according to specific embodiments of the invention, the invention provides a control interface that allows an outlet to be controlled with a one-click control. A round indicator button can provide a color indication of output status, e.g., green indicating that the output is on and white indicating that the output is off. According to specific embodiments of the invention, this indicator can also be clickable to change the status of the outlet thus providing one clickable link that acts as a toggle, allowing an outlet to be changed on and off. To rename an output, click on a label given to the output, e.g., "Corn Server 2" and in either a popup box or the link enter the new name then click Save Label. Generally, according to specific embodiments of the invention, unless a user is an administrator, the user's selection of outputs is limited to what your administrator has assigned. Common users also have no access to logs, users, and setup.

According to specific embodiments of the invention, scheduling for individual outputs can be performed as follows. To set a scheduled task select, for example, a clock icon that corresponds to the output for which it is desired to set the schedule. FIG. 14 is a block diagram illustrating an example output scheduling interface and method according to specific embodiments of the present invention. Once the output is selected, add events by for example changing time, day and then clicking on the Add Event button. Before clicking the Save Schedule Options button, click in the box that indicates scheduling is enabled for this output.

FIG. 15 is a block diagram illustrating an example output label and properties modification interface and method according to specific embodiments of the present invention. This interface can be used to change output labels and adjust other output properties.

FIG. 16 is a block diagram illustrating an example logging interface and method according to specific embodiments of the present invention. According to specific embodiments of the invention, an SPMM keeps a running log of events which, if enabled, can be e-mailed to a designated person. For example, in specific embodiments, once the log file is filled the log is then e-mailed and the memory buffer is then cleared and refreshed. If not setup to E-mail, the unit will then overwrite the oldest event, keeping the log current. Logs may generally also be sent or cleared manually by clicking an appropriate heading that can be provided in specific embodiments.

FIG. 17 is a block diagram illustrating an example user interface and method according to specific embodiments of the present invention. To access the users tab generally a user has to be an administrator. To add or edit an existing user click edit in the row desired. In the popup box enter a user name, password and select the outputs the new user will be able to access. Once the information is complete click the Save User button and the user may now log in. To completely remove a user, indicate delete. FIG. 18 is a block diagram illustrating an example user modification interface and method according to specific embodiments of the present invention.

FIG. 19 is a block diagram illustrating an example web-based setup interface and method according to specific embodiments of the present invention. This interface provides information about such things as time/date, network settings, logging settings, SNMP settings, can also provide information about telephone settings in an SPMM with a telephone interface. Generally, this interface is only accessible to administrators. To make changes using this interface, use the edit button that corresponds to the appropriate heading. For example, to set TIME/DATE, click the corresponding edit button, make the proper changes then click Save.

FIG. 20 is a block diagram illustrating an example network identification interface and method according to specific embodiments of the present invention. This interface can, for example, be provided as a popup box from the overall settings interface. In this interface, enter the IP address to assign to the unit. Enter the units Subnet Mask, DNS, host, and domain name. Once all fields are filled in, click the Save and Reboot button. Generally, network settings will not take affect until the unit has been rebooted.

FIG. 21 is a block diagram illustrating an example telephone setup interface and method according to specific embodiments of the present invention. To setup the telephone interface, click on the corresponding edit button. By placing a check mark in the "enable interface" box, all calls will be processed by the SPMMSPMM. However, if there is no check mark at "Allow callers with no caller ID" the unit will then only answer calls with a caller ID tag and reject all others.

In SPS units with a telephone interface, enabled as described above, the physical interface according to specific embodiments of the present invention can be connected using a standard analog phone line to the phone jack on the front panel of an SPMM. Once connected to an analog phone line and the interface is enabled, an SPMM can now be reached and controlled independently from a network or a computer. From an office desk phone to a private cell phone, there is a truly remote means of control. An SPMM can be configured to block calls from resSPMMcted or unavailable phones. The phone number of the telephone from which a user is calling from must be received by an SPMM in order to access the main menu. According to specific embodiments of the present invention, a system can be configured to "Allow callers with no caller ID," though due to security reasons this is not recommended.

FIG. 22 is a block diagram illustrating an example logging setup interface and method according to specific embodiments of the present invention. Under the Logging heading administrators can setup E-mail properties and server settings. To enable the E-mail logs feature click the corresponding edit button. In the popup box, enter the SMTP server name as well as the E-mail address of the person to receive the logs. The "From" and "Subject" boxes are optionally not required to send the log. Once all enSPMMes are complete and the "Dump logs to E-mail . . . " box is checked, click the save button. The unit is now ready to send the log once the buffer is full. According to specific embodiments of the present invention, the SMTP server acts as an outgoing E-mail server and without the proper SMTP server, the unit will not be able to E-mail out the logs regardless of other settings.

FIG. 23 is a block diagram illustrating an example date/time setup interface and method according to specific embodiments of the present invention. To configure the NTP (Network Time Protocol) settings with an NTP Server addressing delete the default settings and ensure that there is a check in the "Enable NTP" checkbox. Once settings are entered a user can indicate "Save" and the page will refresh with the new time/date that an SPMM received from the local NTP servers. To manually set "Time/Date" uncheck the "Enable NTP" check box, though it is highly recommend use an NTP server.

FIG. 24 is a block diagram illustrating an example SNMP (Simple Network Management Protocol) setup interface and method according to specific embodiments of the present invention. SNMP is by default set to enabled which may cause a security risk. It is therefore suggested to set this to disabled if not used. The MIB (management information base) listing below provides additional information about a specific example SNMP interface according to specific embodiments of the present invention.

FIG. 25 is a block diagram illustrating an example options setup interface and method according to specific embodiments of the present invention. This interface can be provided to change behavioral settings such as refresh rates and output change confirmations. To avoid accidental on/offs, require confirmation for each on/off event on the web by placing a check in the Require confirmation box. With this feature enabled users will have to click on or off then OK or cancel for each output change. The Refresh rate is user definable from 1-999 seconds. Once set the Outputs page will now refresh to the specified time. If the refresh rate is set too fast, the system may not have enough time to load the entire page. Regardless of the refresh rate setting the network speed will determine how fast a page is loaded. A default example setting is at 10 seconds. In further embodiments, a user can set a timed stagger on/off of outlets from 0-5 seconds in millisecond increments.

Software Implementations

Thus, in further embodiments, the present invention may be understood in the context of providing power management over a communication media. An important application for the present invention, and an independent embodiment, is in the field of providing power cycling and monitoring over the Internet, optionally using Internet media protocols and formats, such as HTTP, RTTP (Real-Time Transport Protocol), XML (eXtensible Markup Language), HTML, dHTML (Dynamic Hyper Text Markup Language), VRML (Virtual Reality Markup Language), as well as image, audio, or video formats etc. However, using the teachings provided herein, it will be understood by those of skill in the art that the methods and apparatus of the present invention could be advantageously used in other related situations where users access content over a communication channel, such as modem access systems, institution network systems, wireless systems, etc.

Various embodiments of the present invention provide methods and/or systems for power management and/or monitoring that can be implemented on a general purpose or special purpose information handling appliance using a suitable programming language such as Java, C++, Cobol, C, Pascal, Fortran., PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

As will be further understood from the teachings provided herein, the present invention encompasses a variety of specific embodiments for performing these steps. As further described below, request for power management and monitoring information may be received in a variety of ways, including through one or more graphical user interfaces provided by an SPMM and/or its associated information appliance to the client system or by an SPMM system receiving an email or other digital message or communication from the client system. Thus, according to specific embodiments of the present invention, data and/or indications can be transmitted to an SPMM using any method for transmitting digital data, including HTML communications, FTP communications, email communications, wireless communications, etc. In various embodiments, indications of desired data can be received from a human user selecting from a graphical interface at a computing device example system as illustrated in FIG. 26.

Example Hardware Functional Components

Figure 26:
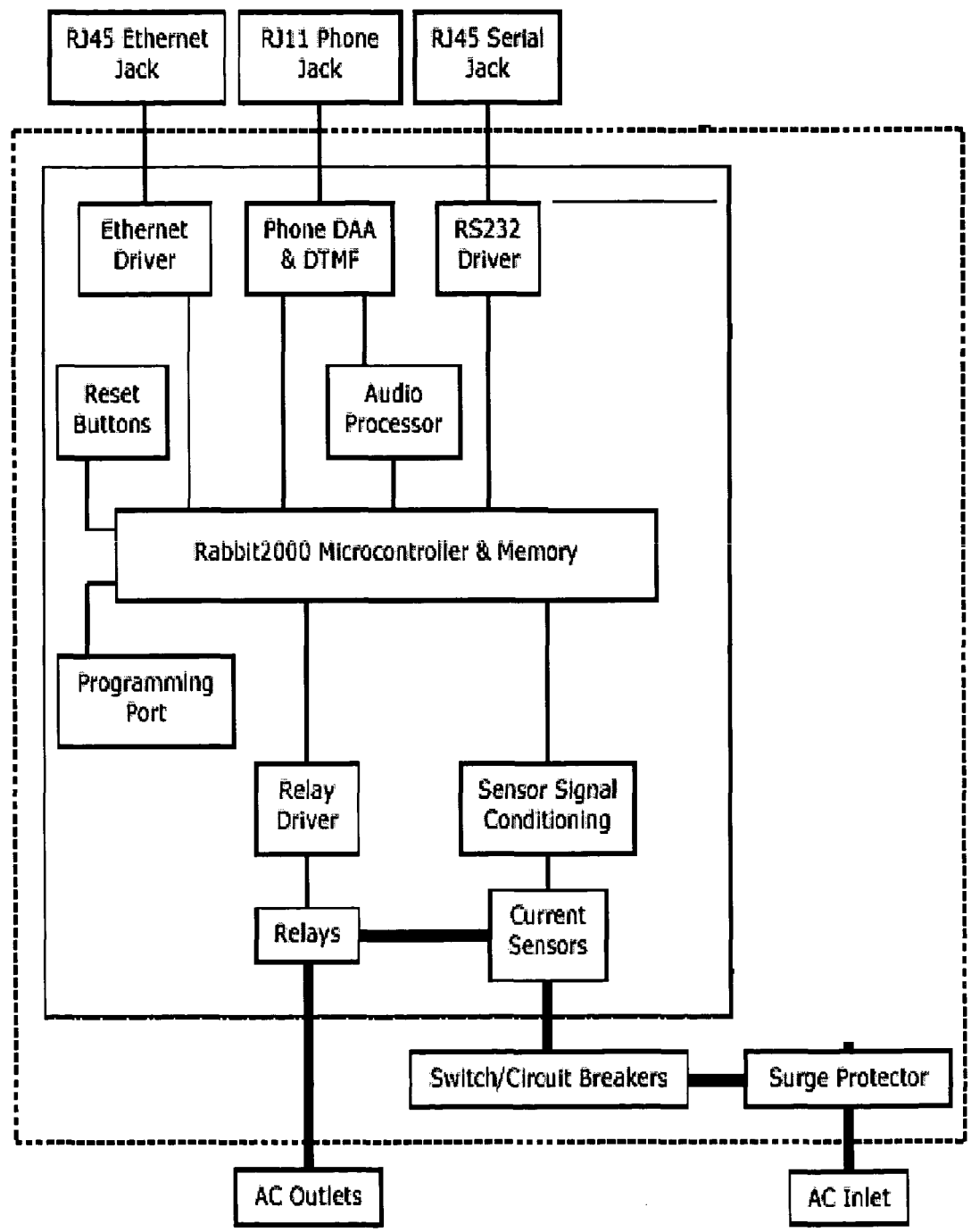
FIG. 26 is a block diagram illustrating example logic modules of smart power monitor/manager components according to specific embodiments of the present invention.

FIG. 26 is a block diagram illustrating example logic modules of smart power monitor/manager components according to specific embodiments of the present invention. This is one example embodiment showing a number of different elements in one or more novel arrangements not of all which will be a part of all embodiments. As will be understood in the art, along with the teachings provided herein, one or more of these functional elements can be included on a primary information appliance component (e.g., a motherboard) or on a separable information appliance component (e.g., a PCI board or daughter board or blade component).

In this example embodiment, various functions as described above are provided by a microprocessor executing a stored-program, such as, for example, a Rabbit2000 Microcontroller and Memory. According to specific embodiments of the invention, the microcontroller provides the logical execution ability to both control one or more outputs using relays and also to provide communications ability through one or more interfaces, such as an Ethernet interface comprising an Ethernet connector (jack) and driver, a phone interface comprising a phone connector (jack) and phone DAA (Data Access Arrangement) & DTMF along with an audio processor for generating audio status indications and/or for recognizing speech commands, a serial interface comprising a serial connector (e.g., a RJ45 serial jack and/or a USB connection) and appropriate drivers.

According to specific embodiments of the invention, current sensors are provided for each output and a sensor signal conditioning module and/or function provides information to the microcontroller for use in reporting current status and/or also for use in providing current control. A surge protector and/or switch/circuit breaker can also be included. Any number of different brands of available modules can be used in specific embodiments of the invention.

Portions of an Example Circuit Description

Figure 27:
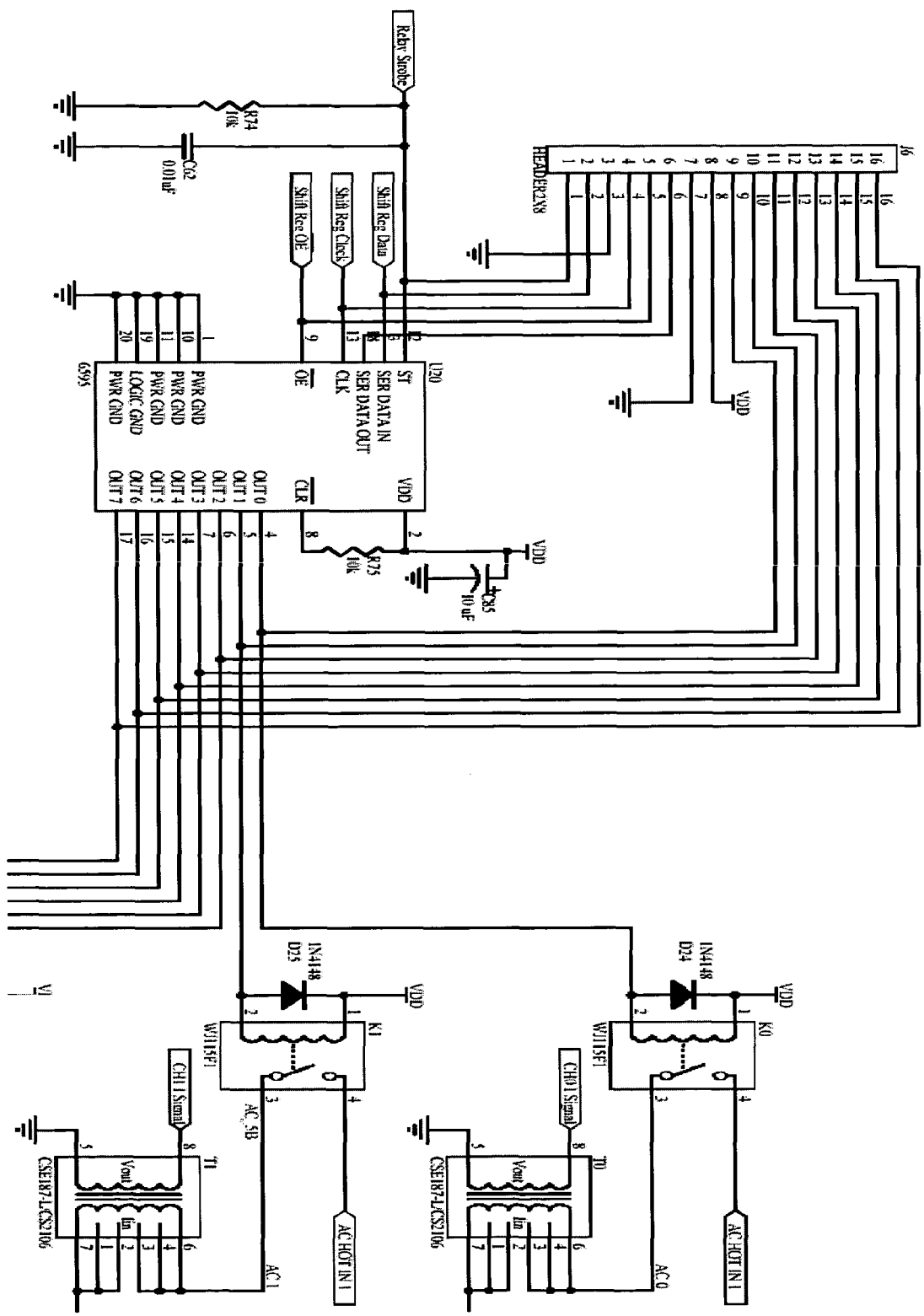
FIG. 27 is a block diagram illustrating details of three power relays of an example configurable power supply according to specific embodiments of the present invention.

FIG. 27 through FIG. 28A-B provide selected details of an example system according to specific embodiments of the invention. These figures include component listings and circuit descriptions that will be familiar in the art. For clarity of disclosure, these figures do not include every detail of every element of an example system, but do show example embodiments of salient features of an SPMM according to specific embodiments of the invention.

FIG. 27 is a block diagram illustrating details of three power relays of an example configurable power supply according to specific embodiments of the present invention. According to specific embodiments of the invention, the number of power relays will correspond to the number of managed power outputs, such as one, two, etc.

FIGS. 28A-B are a block diagrams illustrating details of three current sensors of an example configurable power supply according to specific embodiments of the present invention. According to specific embodiments of the invention, the number of sensors will correspond to the number of managed power outputs, such as one, two, etc. In alternative embodiments, each sensor relay may provided sensing of multiple grouped power outputs. In these figures, eight connections are shown from the relay driver 6595 and ADC08038, though as will be understood in the art, the number of connections actually used will be determined by the number of managed and/or monitored outputs. Alternatively, custom circuits can be used in place of relay driver 6595.

Example SNMP MIB

As is known in the art, SNMP operates using data structures known as MIBs. Provided below is one example MIB that provides further details of a specific embodiment of the invention.

```
CYBERSWITCHING-MIB DEFINITIONS ::= BEGIN
IMPORTS
      enterprises, IpAddress,
      TimeTicks, Counter, Gauge, Opaque FROM RFC1155-SMI
      OBJECT-TYPE FROM RFC-1212
      TRAP-TYPE FROM RFC-1215
      DisplayString FROM RFC1213-MIB;
--
--          Copyright (C) 2003, CyberSwitching. All rights reserved.
cyberswitching                  OBJECT IDENTIFIER ::= { enterprises 14300 }
cyberswitching-products         OBJECT IDENTIFIER ::= { cyberswitching 1 }
-- ========== CyberSwitching NMS products ==========
SPMM                            OBJECT IDENTIFIER ::= { cyberswitching-products 1 }
SPMM-ctrl                       OBJECT IDENTIFIER ::= { SPMM 1 }
SPMM-mgmt                       OBJECT IDENTIFIER ::= { SPMM 2 }
SPEM-traps                      OBJECT IDENTIFIER ::= { SPMM 3 }
oNumber OBJECT-TYPE
      SYNTAX INTEGER
      ACCESS read-only
      STATUS mandatory
      DESCRIPTION
            "The number of managed outputs present on this system."
      ::= { SPMM-ctrl 1 }
oTable OBJECT-TYPE
      SYNTAX SEQUENCE OF OEntry
      ACCESS not-accessible
      STATUS mandatory
      DESCRIPTION
            "A list of output enSPMMes. The number of
            enSPMMes is given by the value of oNumber."
      ::= { SPMM-ctrl 2 }
oEntry OBJECT-TYPE
      SYNTAX OEntry
      ACCESS not-accessible
```

```
            STATUS mandatory
            DESCRIPTION
                    "An output entry containing status and properties
                    of a managed output."
            INDEX   { oIndex }
            ::= { oTable 1 }
OEntry ::=
        SEQUENCE {
            oIndex
                INTEGER,
            oLabel
                DisplayString,
            oState
                INTEGER,
            oCurrentStr
                DisplayString,
            oCurrentFloat
                Opaque,
            oCurrentInt
                INTEGER
        }
oIndex OBJECT-TYPE
        SYNTAX INTEGER (1..8)
        ACCESS read-only
        STATUS mandatory
        DESCRIPTION
                "A unique value for each output. Its value
                ranges between 1 and the value of oNumber."
        ::= { oEntry 1 }
oLabel OBJECT-TYPE
        SYNTAX DisplayString (SIZE (0..15))
        ACCESS read-write
        STATUS mandatory
        DESCRIPTION
                "A textual string containing the output's
                user-friendly name."
        ::= { oEntry 2 }
oState OBJECT-TYPE
        SYNTAX INTEGER {
                    off(1),     -- output is on
                    on(2),      -- output is off
                    error(3)    -- output has a problem
                }
        ACCESS read-write
        STATUS mandatory
        DESCRIPTION
                "The output's state. (ON/OFF/ERROR). Reading oState
                returns the output's state. Setting oState to off
                turns the output off. Setting oState to on turns the
                output on. Setting oState to error is invalid."
        ::= { oEntry 3 }
oCurrentStr OBJECT-TYPE
        SYNTAX DisplayString
        ACCESS read-only
        STATUS mandatory
        DESCRIPTION
                "The amount of current the output is drawing, string
                formatted."
        ::= { oEntry 4 }
oCurrentFloat OBJECT-TYPE
        SYNTAX Opaque
        ACCESS read-only
        STATUS mandatory
        DESCRIPTION
                "The amount of current the output is drawing, in Amps."
        ::= { oEntry 5 }
oCurrentInt OBJECT-TYPE
        SYNTAX INTEGER
        ACCESS read-only
        STATUS mandatory
        DESCRIPTION
                "The amount of current the output is drawing, in Amps
                This is rounded to an integer for applications that can't
                handle strings or floats."
        ::= { oEntry 6 }
oTotCurrentFloat OBJECT-TYPE
        SYNTAX Opaque
        ACCESS read-only
        STATUS mandatory
```

```
        DESCRIPTION
              "The total amount of current the unit is supplying, in Amps."
        ::= { SPMM-ctrl 3 }
oTotCurrentStr OBJECT-TYPE
    SYNTAX DisplayString
    ACCESS read-only
    STATUS mandatory
    DESCRIPTION
              "The total amount of current the unit is supplying.
              (String Formatted)"
        ::= { SPMM-ctrl 4 }
oTotCurrentInt OBJECT-TYPE
    SYNTAX INTEGER
    ACCESS read-only
    STATUS mandatory
    DESCRIPTION
              "The total amount of current the unit is supplying, in Amps.
              This is rounded to an integer for applications that can't
              handle strings or floats."
        ::= { SPMM-ctrl 5 }
oStateMask OBJECT-TYPE
    SYNTAX INTEGER
    ACCESS read-only
    STATUS mandatory
    DESCRIPTION
              "Bits 0-8 = the state of all eight outputs. 0 is off
              1 is on."
        ::= { SPMM-ctrl 6 }
SPMMSysTimeDate OBJECT-TYPE
    SYNTAX TimeTicks
    ACCESS read-write
    STATUS mandatory
    DESCRIPTION
              "Time in hundredths of a second since January 1, 1980."
        ::= { SPMM-mgmt 1 }
SPMMTimeZone OBJECT-TYPE
    SYNTAX INTEGER (-13..13)
    ACCESS read-write
    STATUS mandatory
    DESCRIPTION
              "Time zone as an offset from GMT"
        ::= { SPMM-mgmt 2 }
SPMMDaylightSavings OBJECT-TYPE
    SYNTAX INTEGER {
              disabled(1),    -- Time is in standard time.
              enabled(2)      -- Time is in daylight savings time.
        }
    ACCESS read-write
    STATUS mandatory
    DESCRIPTION
              "When enabled, the clock is adjusted for daylight savings."
        ::= { SPMM-mgmt 3 }
SPMMNTPEnabled OBJECT-TYPE
    SYNTAX INTEGER {
              disabled(1),    -- NTP is disabled. Time must be set manually.
              enabled(2)      -- NTP is enabled. Unit will attempt to get network time.
        }
    ACCESS read-write
    STATUS mandatory
    DESCRIPTION
              "When enabled, the unit will attempt to set its clock from the
              network using NTP servers 1 & 2."
        ::= { SPMM-mgmt 4 }
SPMMNTPServer1 OBJECT-TYPE
    SYNTAX DisplayString (SIZE (0..59))
    ACCESS read-write
    STATUS mandatory
    DESCRIPTION
              "Time server #1. Set to 255.255.255.255 to broadcast time requests."
        ::= { SPMM-mgmt 5 }
SPMMNTPServer2 OBJECT-TYPE
    SYNTAX DisplayString (SIZE (0..59))
    ACCESS read-write
    STATUS mandatory
    DESCRIPTION
              "Time server #2. Will be used if Timer Server #1 fails.
              Set to 255.255.255.255 to broadcast time requests."
        ::= { SPMM-mgmt 6 }
SPMMDHCPEnabled OBJECT-TYPE
```

-continued

```
        SYNTAX INTEGER {
                disabled(1),    -- DHCP is disabled. Network Settings must be set manually.
                enabled(2)      -- DHCP is enabled. Unit will attempt to get settings from DHCP
server.
        }
    ACCESS read-write
    STATUS mandatory
    DESCRIPTION
        "When enabled, the unit will attempt to get its network settings from a DHCP
        server upon booting. If this fails, it will revert to the manual settings."
    ::= { SPMM-mgmt 7 }
SPMMNetworkIP OBJECT-TYPE
    SYNTAX IpAddress
    ACCESS read-write
    STATUS mandatory
    DESCRIPTION
        "IP of this SPMM Unit."
    ::= { SPMM-mgmt 8 }
SPMMSubnetMask OBJECT-TYPE
    SYNTAX IpAddress
    ACCESS read-write
    STATUS mandatory
    DESCRIPTION
        "Subnet Mask of this SPMM Unit."
    ::= { SPMM-mgmt 9 }
SPMMGateway OBJECT-TYPE
    SYNTAX IpAddress
    ACCESS read-write
    STATUS mandatory
    DESCRIPTION
        "Gateway of this SPMM Unit."
    ::= { SPMM-mgmt 10 }
SPMMDNS OBJECT-TYPE
    SYNTAX IpAddress
    ACCESS read-write
    STATUS mandatory
    DESCRIPTION
        "Domain Name Server of this SPMM Unit."
    ::= { SPMM-mgmt 11 }
SPMMHostName OBJECT-TYPE
    SYNTAX DisplayString (SIZE (0..15))
    ACCESS read-write
    STATUS mandatory
    DESCRIPTION
        "Host Name of this SPMM Unit."
    ::= { SPMM-mgmt 12 }
SPMMDomain OBJECT-TYPE
    SYNTAX DisplayString (SIZE (0..15))
    ACCESS read-write
    STATUS mandatory
    DESCRIPTION
        "Domain of this SPMM Unit."
    ::= { SPMM-mgmt 13 }
SPMMPhoneEnabled OBJECT-TYPE
    SYNTAX INTEGER {
                disabled(1),    -- Phone interface is DISABLED
                enabled(2)      -- Phone interface is ENABLED
        }
    ACCESS read-write
    STATUS mandatory
    DESCRIPTION
        "Operational mode of the phone interface."
    ::= { SPMM-mgmt 14 }
SPMMBlockNoCallerID OBJECT-TYPE
    SYNTAX INTEGER {
                noblock(1),     -- Calls with no CallerID are allowed
                block(2)        -- Calls with no CallerID are blocked
        }
    ACCESS read-write
    STATUS mandatory
    DESCRIPTION
        "No CallerID blocking mode."
    ::= { SPMM-mgmt 15 }
SPMMPhonePin OBJECT-TYPE
    SYNTAX DisplayString (SIZE (0..15))
    ACCESS read-write
    STATUS mandatory
    DESCRIPTION
        "PIN used to access the phone interface. This must be
```

-continued

```
                at least 6 characters."
        ::= { SPMM-mgmt 16 }
SPMMSyslogServer OBJECT-TYPE
    SYNTAX DisplayString (SIZE (0..59))
    ACCESS read-write
    STATUS mandatory
    DESCRIPTION
            "Server name to send BSD Syslog style log events to. Set this to a
            NULL string to disable Syslog. (events will still be logged locally)"
    ::= { SPMM-mgmt 17 }
SPMMLoggingFacility OBJECT-TYPE
    SYNTAX INTEGER {
                local-0(1),
                local-1(2),
                local-2(3),
                local-3(4),
                local-4(5),
                local-5(6),
                local-6(7),
                local-7(8)
            }
    ACCESS read-write
    STATUS mandatory
    DESCRIPTION
            "BSD Syslog Logging Facility."
    ::= { SPMM-mgmt 18 }
SPMMLoggingLevel OBJECT-TYPE
    SYNTAX INTEGER {
                emergency(1),
                alert(2),
                critical(3),
                error(4),
                warning(5),
                notice(6),
                informational(7),
                debug(8)
            }
    ACCESS read-write
    STATUS mandatory
    DESCRIPTION
            "BSD Syslog Logging Level. This affects the amount of logging performed."
    ::= { SPMM-mgmt 19 }
SPMMDumpLogs OBJECT-TYPE
    SYNTAX INTEGER {
                nodump(1),      -- do not dump logs to email
                dump(2)         -- dump logs to email
            }
    ACCESS read-write
    STATUS mandatory
    DESCRIPTION
            "Dump Logs to email when full option."
    ::= { SPMM-mgmt 20 }
SPMMSMTPServer OBJECT-TYPE
    SYNTAX DisplayString (SIZE (0..59))
    ACCESS read-write
    STATUS mandatory
    DESCRIPTION
            "Server used to send email."
    ::= { SPMM-mgmt 21 }
SPMMEmailTo OBJECT-TYPE
    SYNTAX DisplayString (SIZE (0..59))
    ACCESS read-write
    STATUS mandatory
    DESCRIPTION
            "Address to send email to."
    ::= { SPMM-mgmt 22 }
SPMMEmailFrom OBJECT-TYPE
    SYNTAX DisplayString (SIZE (0..59))
    ACCESS read-write
    STATUS mandatory
    DESCRIPTION
            "Address to send email from."
    ::= { SPMM-mgmt 23 }
SPMMEmailSubject OBJECT-TYPE
    SYNTAX DisplayString (SIZE (0..59))
    ACCESS read-write
    STATUS mandatory
    DESCRIPTION
            "Subject of email."
```

```
    ::= { SPMM-mgmt 24 }
SPMMOutputConfirmation OBJECT-TYPE
    SYNTAX INTEGER {
            noconfirm(1),   -- do not confirm output changes
            confirm(2)      -- confirm output changes
            }
    ACCESS read-write
    STATUS mandatory
    DESCRIPTION
            "Whether or not to confirm output changes from web
            interface."
    ::= { SPMM-mgmt 32 }
SPMMWebRefresh OBJECT-TYPE
    SYNTAX INTEGER (5..999)
    ACCESS read-write
    STATUS mandatory
    DESCRIPTION
            "Number of seconds (5-999) to wait before refreshing
            outputs on web interface."
    ::= { SPMM-mgmt 33 }
SPMMOutputStaggerTime OBJECT-TYPE
    SYNTAX INTEGER (0..5000)
    ACCESS read-write
    STATUS mandatory
    DESCRIPTION
            "Number of milliseconds (0-5,000) to pause between outputs when
            turning on/off multiple outputs at once."
    ::= { SPMM-mgmt 34 }
SPMMOSchedules OBJECT-TYPE
    SYNTAX SEQUENCE OF SPMMScheduleEntry
    ACCESS not-accessible
    STATUS mandatory
    DESCRIPTION
            "A List of Schedules."
    ::= { SPMM-mgmt 35 }
SPMMScheduleEntry OBJECT-TYPE
    SYNTAX SPMMScheduleEntry
    ACCESS not-accessible
    STATUS mandatory
    DESCRIPTION
            "An output schedule entry"
    INDEX { SPMMScheduleIndex }
    ::= { SPMMOSchedules 1 }
SPMMScheduleEntry ::=
    SEQUENCE {
        SPMMScheduleIndex
            INTEGER,
        SPMMScheduleEnabled
            INTEGER
    }
SPMMScheduleIndex OBJECT-TYPE
    SYNTAX INTEGER (1..8)
    ACCESS read-only
    STATUS mandatory
    DESCRIPTION
            "A unique value for each output. Its value
            ranges between 1 and oNumber."
    ::= { SPMMScheduleEntry 1 }
SPMMScheduleEnabled OBJECT-TYPE
    SYNTAX INTEGER {
            disabled(1),    -- output is disabled
            enabled(2)      -- output is enabled
            }
    ACCESS read-write
    STATUS mandatory
    DESCRIPTION
            "Enable status of schedule."
    ::= { SPMMScheduleEntry 2 }
SPMMlogs OBJECT-TYPE
    SYNTAX SEQUENCE OF SPMMLogEntry
    ACCESS not-accessible
    STATUS mandatory
    DESCRIPTION
            "A List of Log EnSPMMes."
    ::= { SPMM-mgmt 38 }
SPMMLogEntry OBJECT-TYPE
    SYNTAX SPMMLogEntry
    ACCESS not-accessible
    STATUS mandatory
```

```
        DESCRIPTION
                "A Log Entry Display String."
        INDEX { SPMMLogIndex }
        ::= { SPMMlogs 1 }
SPMMLogEntry ::=
    SEQUENCE {
        SPMMLogIndex
            INTEGER,
        SPMMLogString
            DisplayString
    }
SPMMLogIndex OBJECT-TYPE
    SYNTAX INTEGER (1..32)
    ACCESS read-only
    STATUS mandatory
    DESCRIPTION
            "A unique value for each log entry. Its value
            ranges between 1 and SPMMnumlogs."
    ::= { SPMMLogEntry 1 }
SPMMLogString OBJECT-TYPE
    SYNTAX DisplayString
    ACCESS read-only
    STATUS mandatory
    DESCRIPTION
            "The log entry in string form."
    ::= { SPMMLogEntry 2 }
SPMMNumLogs OBJECT-TYPE
    SYNTAX INTEGER
    ACCESS read-only
    STATUS mandatory
    DESCRIPTION
            "The number of Log enSPMMes available"
    ::= { SPMM-mgmt 39 }
-- TRAPS
SPMMOutputCurrentTraps OBJECT-TYPE
    SYNTAX SEQUENCE OF SPMMCurrentTrapEntry
    ACCESS not-accessible
    STATUS mandatory
    DESCRIPTION
            "Table of current trap limits."
    ::= { SPMM-traps 1 }
SPMMCurrentTrapEntry OBJECT-TYPE
    SYNTAX SPMMCurrentTrapEntry
    ACCESS not-accessible
    STATUS mandatory
    DESCRIPTION
            "An output entry containing status and properties
            of a managed output."
    INDEX { SPMMCurIndex }
    ::= { SPMMOutputCurrentTraps 1 }
SPMMCurrentTrapEntry ::=
    SEQUENCE {
        SPMMCurIndex
            INTEGER,
        SPMMCurLoEnabled
            INTEGER,
        SPMMCurLoBound
            DisplayString,
        SPMMCurLoGracePeriod
            INTEGER (0..65535),
        SPMMCurHiEnabled
            INTEGER,
        SPMMCurHiBound
            DisplayString,
        SPMMCurHiGracePeriod
            INTEGER (0..65535)
    }
SPMMCurIndex OBJECT-TYPE
    SYNTAX INTEGER (1..8)
    ACCESS read-only
    STATUS mandatory
    DESCRIPTION
            "A unique value for each output. Its value
            ranges between 1 and the value of oNumber."
    ::= { SPMMCurrentTrapEntry 1 }
SPMMCurLoEnabled OBJECT-TYPE
    SYNTAX INTEGER {
            disabled(1),    -- trap is disabled
            enabled(2)      -- trap is enabled
```

-continued

```
            }
        ACCESS read-write
        STATUS mandatory
        DESCRIPTION
                "Low current bound trap enable. When enabled, a trap will
                be generated when current falls below SPMMCurLoBound and
                stays below for longer than SPMMCurLoGracePeriod."
        ::= { SPMMCurrentTrapEntry 2 }
SPMMCurLoBound OBJECT-TYPE
        SYNTAX DisplayString (SIZE(0..20))
        ACCESS read-write
        STATUS mandatory
        DESCRIPTION
                "Low current boundary. This string must contain only a valid
                floating-point number representing current in Amps between
                0.0 and 99.9. When the output current falls below this value,
                and stays below for longer than SPMMCurLoGracePeriod a trap
                will be generated."
        ::= { SPMMCurrentTrapEntry 3 }
SPMMCurLoGracePeriod OBJECT-TYPE
        SYNTAX INTEGER (0..65535)
        ACCESS read-write
        STATUS mandatory
        DESCRIPTION
                "Low current grace period in Seconds. When the output
                current falls below SPMMCurLoBound, and stays below for longer
                than this value, a trap will be generated. Care should be
                taken not to set this too low, or the network might be
                flooded with traps if the current rapidly fluctuates around
                SPMMCurLoBound."
        ::= { SPMMCurrentTrapEntry 4 }
SPMMCurHiEnabled OBJECT-TYPE
        SYNTAX INTEGER {
                        disabled(1),    -- trap is disabled
                        enabled(2)      -- trap is enabled
                }
        ACCESS read-write
        STATUS mandatory
        DESCRIPTION
                "High current bound trap enable. When enabled, a trap will
                be generated when current rises above SPMMCurHiBound and
                stays above for longer than SPMMCurHiGracePeriod."
        ::= { SPMMCurrentTrapEntry 5 }
SPMMCurHiBound OBJECT-TYPE
        SYNTAX DisplayString (SIZE(0..20))
        ACCESS read-write
        STATUS mandatory
        DESCRIPTION
                "High current boundary. This string must contain only a valid
                floating-point number representing current in Amps between
                0.0 and 99.9. when the output current rises above this value,
                and stays above for longer than SPMMCurHiGracePeriod a trap
                will be generated."
        ::= { SPMMCurrentTrapEntry 6 }
SPMMCurHiGracePeriod OBJECT-TYPE
        SYNTAX INTEGER (0..65535)
        ACCESS read-write
        STATUS mandatory
        DESCRIPTION
                "High current grace period in Milliseconds. When the output
                current rises above SPMMCurHiBound, and stays above for longer
                than this value, a trap will be generated. Care should be
                taken not to set this too low, or the network might be
                flooded with traps if the current rapidly fluctuates around
                SPMMCurHiBound."
        ::= { SPMMCurrentTrapEntry 7 }
SPMMOutputTrapped OBJECT-TYPE
        SYNTAX INTEGER
        ACCESS read-only
        STATUS mandatory
        DESCRIPTION
                "The output that caused a trap (1-oNumber). This trap variable
                is supplied for convenience. It should allow a management tool
                to respond to output-specific traps with less parsing."
        ::= { SPMM-traps 2 }
SPMMTotalCurrentCritical TRAP-TYPE
        ENTERPRISE cyberswitching
        VARIABLES { oTotCurrentStr, oTotCurrentFloat }
        DESCRIPTION
```

```
                    "Total current has gone above unit's circuit protection."
        ::= 1
SPMMTotalCurrentWarning TRAP-TYPE
        ENTERPRISE cyberswitching
        VARIABLES { oTotCurrentStr, oTotCurrentFloat }
        DESCRIPTION
                    "Total current has gone above rated unit capacity."
        ::= 2
SPMMOutputLowCurrentWarning TRAP-TYPE
        ENTERPRISE cyberswitching
        VARIABLES { SPMMOutputTrapped, oCurrentStr, oCurrentFloat }
        DESCRIPTION
                    "Current has gone below SPMMCurLoBound and
                    stayed there for longer than SPMMCurLoGracePeriod."
        ::= 3
SPMMOutputHighCurrentWarning TRAP-TYPE
        ENTERPRISE cyberswitching
        VARIABLES { SPMMOutputTrapped, oCurrentStr, oCurrentFloat }
        DESCRIPTION
                    "Current has gone above SPMMCurHiBound and
                    stayed there for longer than SPMMCurHiGracePeriod."
        ::= 4
END
```

OTHER EMBODIMENTS

The invention has now been described with reference to specific embodiments. Other embodiments will be apparent to those of skill in the art. In particular, a viewer digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

Furthermore, various different actions can be used to effect power management. For example, a voice command may be spoken by the purchaser, a key may be depressed by the purchaser, a button on a client-side scientific device may be depressed by the user, or selection using any pointing device may be effected by the user.

All publications, patents, and patent applications cited herein or filed with this application, including any references filed as part of an Information Disclosure Statement, are incorporated by reference in their entirety.

What is claimed:

1. A smart power manager monitor comprising:
    a logic controller able to execute logic instructions and operatively connected to:
    one or more interface connections;
    a memory storing logic instructions;
    said controller separately controlling on and off states for two or more relays each individually connecting a power source to a power output;
    said controller receiving current draw data from two or more current sensors each individually sensing current drawn through one of said two or more relays said two or more current sensors thereby providing separate current readings for separate power outputs to said logic controller;
    said logic controller thereby able to report current draw data for two or more of said power outputs using said one or more interface connections; and
    an inlet for receiving power from an external source.

2. The device of claim 1 further wherein:
    said at least one interface connection is selected from:
        a network connection;
        a telephone connection; or
        a direct serial connection.

3. The device of claim 1 further wherein:
    said logic circuitry provides at least one external interface selected from:
        an web-based interface;
        a telephone interface;
        a telnet interface;
        an email interface;
        a serial interface; or
        an SNMP interface.

4. The device of claim 1 further wherein:
    said logic circuitry comprises:
    a microcontroller.

5. The device of claim 4 further wherein:
    said logic circuitry further comprises:
    one or more drivers and/or processors for operating said interfaces and/or said outputs.

6. A method of managing power within an information appliance comprising:
    receiving power from an external source at a first connector;
    connecting power to two or more controllable relays, said controllable relays providing two or more managed power domains for information appliance components;
    sensing current using two or more current sensors, each individually sensing current drawn through said two or more controllable relays, said two or more current sensors thereby providing separate current readings for said separate power domains; and
    providing at least one physical communication interface with power connections outside of said managed power domains; and
    executing logic instructions on power management components powered outside of said managed power domains for controlling said relays and communicating on said communication interface; and executing logic instructions on said power management components to receive individual current monitoring results and to provide said results to users over said communication interface.

7. The method of claim 6 further comprising:

providing at least one user interface, said interface executed on logic circuitry provided by said power management components.

8. The method of claim 6 further comprising:

providing at least one interface allowing a user to independently schedule switching power on and off for each of said power domains;

receiving user indications to configure and/or change operating states of said power domains; and using power management logic operatively connected to said domains to change states and/or configurations of said domains in accordance with said user indications.

9. The method of claim 6 further comprising:

accepting indications registering one or more non-administrator users; and granting non-administrator users access individually to one or more of said domains.

10. The method of claim 6 further wherein:

said power is received on a main processing board of said appliance and said controllable relays reside on said main board.

11. The method of claim 6 further wherein:

said power is received on a component board of said appliance and said controllable relays reside on said component board, said component board having at least one connection to a main board of said system.

12. The method of claim 6 further wherein:

said power is received on a component board of said system, said component board providing a plurality of power domains to one or more other boards in said appliance.

* * * * *